(12) United States Patent
Kim et al.

(10) Patent No.: US 11,455,178 B2
(45) Date of Patent: Sep. 27, 2022

(54) METHOD FOR PROVIDING ROUTINE TO DETERMINE A STATE OF AN ELECTRONIC DEVICE AND ELECTRONIC DEVICE SUPPORTING SAME

(71) Applicant: Samsung Electronics Co., Ltd., Gyeonggi-do (KR)

(72) Inventors: Songgeun Kim, Gyeonggi-do (KR); Sangheon Kim, Gyeonggi-do (KR); Kyuchul Kong, Gyeonggi-do (KR); Yongkwon Kim, Gyeonggi-do (KR); Donggil Son, Gyeonggi-do (KR); Yunjeong Choi, Gyeonggi-do (KR); Jongwu Baek, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/793,604

(22) Filed: Feb. 18, 2020

(65) Prior Publication Data

US 2020/0264907 A1    Aug. 20, 2020

(30) Foreign Application Priority Data

Feb. 18, 2019  (KR) .................... 10-2019-0018554

(51) Int. Cl.
*G06F 9/451* (2018.01)
*G06F 3/04847* (2022.01)
(Continued)

(52) U.S. Cl.
CPC .......... *G06F 9/451* (2018.02); *G06F 3/04847* (2013.01); *G06N 5/04* (2013.01); *H04B 1/3827* (2013.01); *G06N 20/00* (2019.01)

(58) Field of Classification Search
CPC ... G06F 9/451; G06F 3/04847; H04B 1/3827; G06N 5/04; G06N 20/00
See application file for complete search history.

(56) References Cited

U.S. PATENT DOCUMENTS

2003/0159137 A1    8/2003  Drake et al.
2006/0005140 A1*   1/2006  Crew ............... G06Q 10/06316
                                                715/760
(Continued)

FOREIGN PATENT DOCUMENTS

KR    1020150025257    3/2015
KR    1020150068175    6/2015
(Continued)

OTHER PUBLICATIONS

P. Ashar et al., Sequential Logic Synthesis, Springer Science+Business Media New York 1992 (Year: 1992).*

(Continued)

*Primary Examiner* — James T Tsai
(74) *Attorney, Agent, or Firm* — The Farrell Law Firm, P.C.

(57) ABSTRACT

An electronic device includes a user interface; at least one processor operably coupled to the user interface; and a memory operably coupled to the at least one processor, wherein memory is configured to store instructions that, when executed, cause the at least one processor to determine, when the electronic device is in a first state, whether or not a first condition is satisfied; perform a first action of changing a state of the electronic device from the first state to a second state if the first condition is satisfied; receive, through the user interface, a user input of changing the state of the electronic device from the second state to a third state; change the state of the electronic device from the second state to the third state at least partially based on the received user input; and maintain the third state even if the first condition is not satisfied in the third state.

10 Claims, 27 Drawing Sheets

(51) Int. Cl.
*G06N 5/04* (2006.01)
*H04B 1/3827* (2015.01)
*G06N 20/00* (2019.01)

(56) References Cited

U.S. PATENT DOCUMENTS

| | | | |
|---|---|---|---|
| 2011/0004837 A1* | 1/2011 | Copland | G06F 8/38 |
| | | | 715/765 |
| 2011/0026737 A1 | 2/2011 | Park | |
| 2012/0172027 A1* | 7/2012 | Partheesh | H04M 1/72415 |
| | | | 455/420 |
| 2012/0280921 A1 | 11/2012 | Kwon | |
| 2014/0136451 A1 | 5/2014 | Marti et al. | |
| 2014/0188471 A1 | 7/2014 | Haughay | |
| 2014/0351182 A1* | 11/2014 | Canoy | G06N 20/00 |
| | | | 706/12 |
| 2015/0159893 A1* | 6/2015 | Daubman | H04L 12/2823 |
| | | | 700/278 |
| 2015/0347519 A1 | 12/2015 | Hornkvist et al. | |
| 2016/0259656 A1 | 9/2016 | Sumner et al. | |
| 2016/0342379 A1* | 11/2016 | Keipert | H04N 5/60 |
| 2017/0091612 A1 | 3/2017 | Gruber et al. | |
| 2017/0092270 A1 | 3/2017 | Newendorp et al. | |
| 2017/0094638 A1 | 3/2017 | Borges et al. | |
| 2017/0359193 A1 | 12/2017 | Smith et al. | |
| 2018/0083913 A1* | 3/2018 | Ganesh | G06F 3/0484 |
| 2018/0288161 A1* | 10/2018 | Saxena | H04W 4/33 |
| 2018/0330731 A1 | 11/2018 | Zeitlin et al. | |
| 2019/0025782 A1* | 1/2019 | Mathews | G05B 15/02 |
| 2019/0377989 A1* | 12/2019 | Dizengof | G06F 9/448 |
| 2020/0050330 A1* | 2/2020 | Schilling | G06F 9/44505 |
| 2021/0010315 A1* | 1/2021 | Honjo | H04L 12/2827 |

FOREIGN PATENT DOCUMENTS

| | | |
|---|---|---|
| KR | 1020160055023 | 5/2016 |
| KR | 1020170062362 | 6/2017 |
| KR | 1020190004896 | 1/2019 |

OTHER PUBLICATIONS

Anonymous: "How to get workflows for your iphone & ipad", XP055742791, Apr. 25, 2018, 9 pages.
European Search Report dated Nov. 4, 2020 issued in counterpart application No. 20157988.5-1203, 18 pages.
Ry Crist: "How to Automatically Turn on your Lights when you get Home—CNET", XP055713717, Oct. 24, 2018, 5 pages.
International Search Report dated Jun. 11, 2020 issued in counterpart application No. PCT/KR2020/002352, 9 pages.
European Search Report dated Jul. 27, 2020 issued in counterpart application No. 20157988.5-1203, 15 pages.
European Search Report dated May 30, 2022 issued in counterpart application No. 20157988.5-1224, 10 pages.

* cited by examiner

900

910

| Condition ID | State value before action | State value after action | TimeStamp |
|---|---|---|---|
| A2 | 100 | 0 | 10001 |
| A1 | 50 | 100 | 10000 |

920

| Condition ID | State value before action | State value after action | TimeStamp |
|---|---|---|---|
| A2 | 50 | 0 | 10001 |

FIG.9

METHOD FOR PROVIDING ROUTINE TO DETERMINE A STATE OF AN ELECTRONIC DEVICE AND ELECTRONIC DEVICE SUPPORTING SAME

CROSS-REFERENCE TO RELATED APPLICATION(S)

This application is based on and claims priority under 35 U.S.C. § 119 to Korean Patent Application No. 10-2019-0018554, filed on Feb. 18, 2019, in the Korean Intellectual Property Office, the disclosure of which is incorporated by reference herein in its entirety.

BACKGROUND

1. Field

The present disclosure relates to a method for providing a routine and an electronic device supporting the same.

2. Description of Related Art

Technologies related to artificial intelligence (AI) systems have recently been developed. AI systems may refer to computer systems for implementing human-level intelligence, wherein the rate of recognition is improved in proportion to the extent of autonomous learning, determination, and usage by machines.

An electronic device may use such an AI system to determine a user's pattern (for example, life pattern, electronic device usage pattern) and provide a personalized service according to the user's pattern. For example, a user may configure a desired condition and a desired operation through an electronic device such that, if the condition desired by the user is satisfied, the electronic device performs the operation desired by the user. The electronic device may use an AI system such that, when the electronic device has confirmed that the condition configured by the user is satisfied, the electronic device performs the configured operation in response to the configured condition. In a case of a conventional electronic device, if a condition configured by a user is no longer satisfied (or if the condition is released) after the electronic device has performed an operation corresponding to the configured condition, the electronic device does not perform any operation for changing (or restoring) the state of the electronic device to the state of the electronic device before the operation was performed.

SUMMARY

An aspect of the present disclosure provides a method for providing a routine and an electronic device supporting the same, wherein, if a condition configured by a user is no longer satisfied after the electronic device has performed an operation corresponding to the configured condition, the state of the electronic device may be changed to the state of the electronic device before the operation has been performed.

According to an aspect of the present disclosure, an electronic device is provided. The electronic device includes a user interface; at least one processor operably coupled to the user interface; and a memory operably coupled to the at least one processor, wherein the memory is configured to store instructions that, when executed, cause the at least one processor to determine, when the electronic device is in a first state, whether or not a first condition is satisfied; perform a first action of changing a state of the electronic device from the first state to a second state if the first condition is satisfied; receive, through the user interface, a user input of changing the state of the electronic device from the second state to a third state; change the state of the electronic device from the second state to the third state at least partially based on the received user input; and maintain the third state even if the first condition is not satisfied in the third state.

According to another aspect of the present disclosure, an electronic device is provided. The electronic device includes a user interface; at least one processor operably coupled to the user interface; and a memory operably coupled to the at least one processor, wherein the memory is configured to store instructions that, when executed, cause the at least one processor to determine, when the electronic device is in a first state, whether or not a first condition is satisfied; perform a first action of changing a state of the electronic device from the first state to a second state if the first condition is satisfied; determine whether or not a second condition is satisfied when the electronic device is in the second state; perform a second action of changing the state of the electronic device from the second state to a third state if the second condition is satisfied; maintain the state of the electronic device in the third state if the second condition is satisfied but the first condition is no longer satisfied, when the electronic device is in the third state; and restore the state of the electronic device from the third state to the first state if the first condition and the second condition are no longer satisfied, when the electronic device is in the third state.

According to another aspect of the present disclosure, an electronic device is provided. The electronic device includes a communication interface configured to perform wireless communication; at least one processor operably coupled to the communication interface; and a memory operably coupled to the at least one processor, wherein the memory is configured to store instructions that, when executed, cause the at least one processor to receive information related to a first routine including a first action that is executed if a first condition is satisfied, by using the communication interface, from an external electronic device; determine whether or not the first action is capable of being performed if the first condition is satisfied when the electronic device is in a first state, at least partially based on the received information related to the first routine; store the first routine and the first state in the memory if the first action is capable of being performed; perform the first action to change the first state to a second state, after storing the first routine and the first state; and return the electronic device to the first state after the first action is performed.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a chart of a method for restoring the state of an electronic device after multiple routines are executed, according to an embodiment;

DETAILED DESCRIPTION

Figure 1:
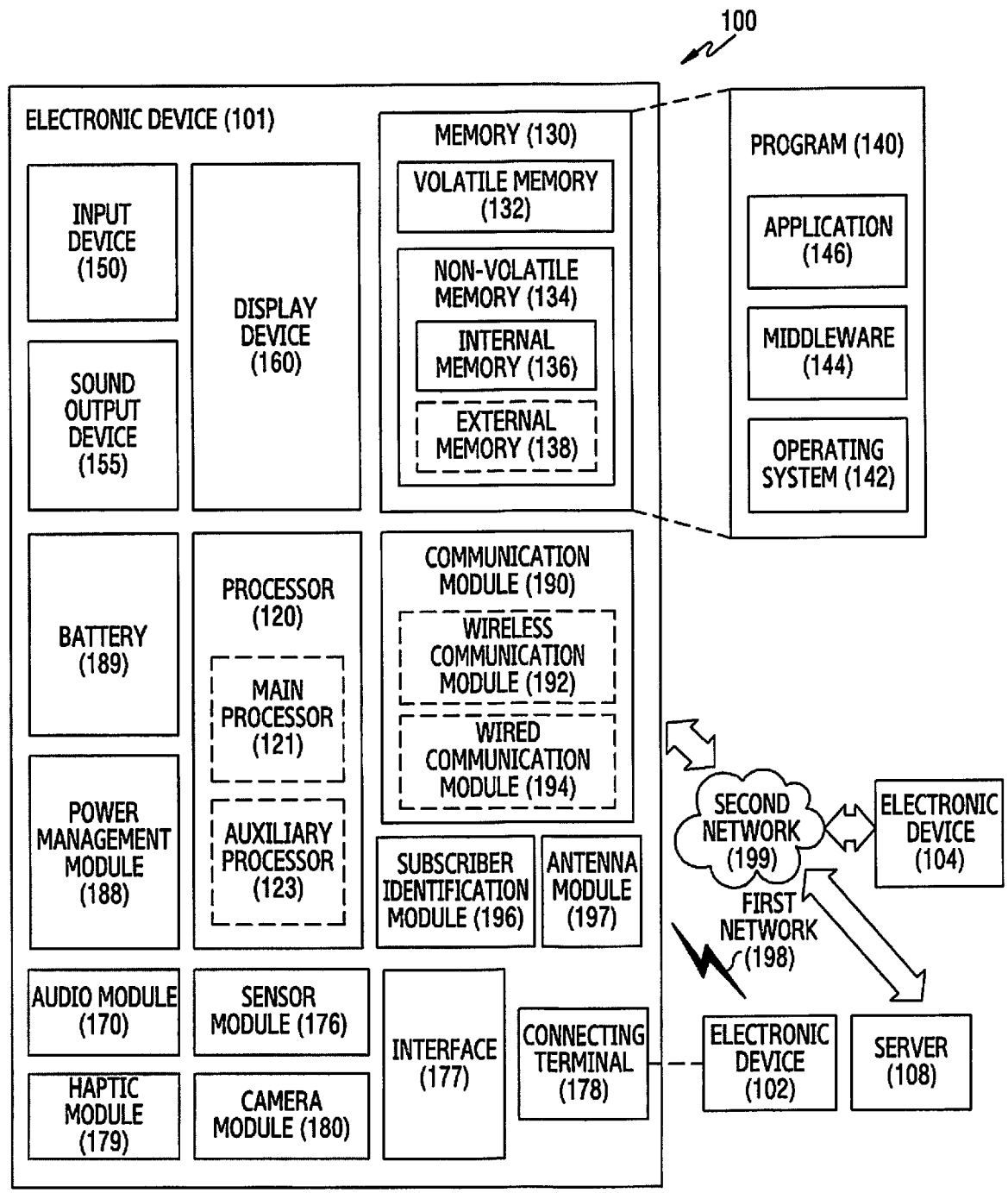
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or a software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via a tactile sensation or a kinesthetic sensation. The haptic module 179 may include, for example, a motor, a piezoelectric element, or an electrical stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 101 and the external electronic device 104 via the server 108 coupled with the second network 199. Each of the electronic device 102 and the electronic device 104 may be a device of a same type as, or a different type from, the electronic device 101. All or some of operations to be executed at the electronic device 101 may be executed at one or more of the external electronic device 102, the external electronic 104, or the external server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the present disclosure to particular embodiments and include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st," "2nd," "first," and "second" may be used to simply distinguish a corresponding component from another component, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used interchangeably with other terms, for example, "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave), where the term does not differentiate between where data is semi-permanently stored in the storage medium and where the data is temporarily stored in the storage medium.

A method according to an embodiment of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
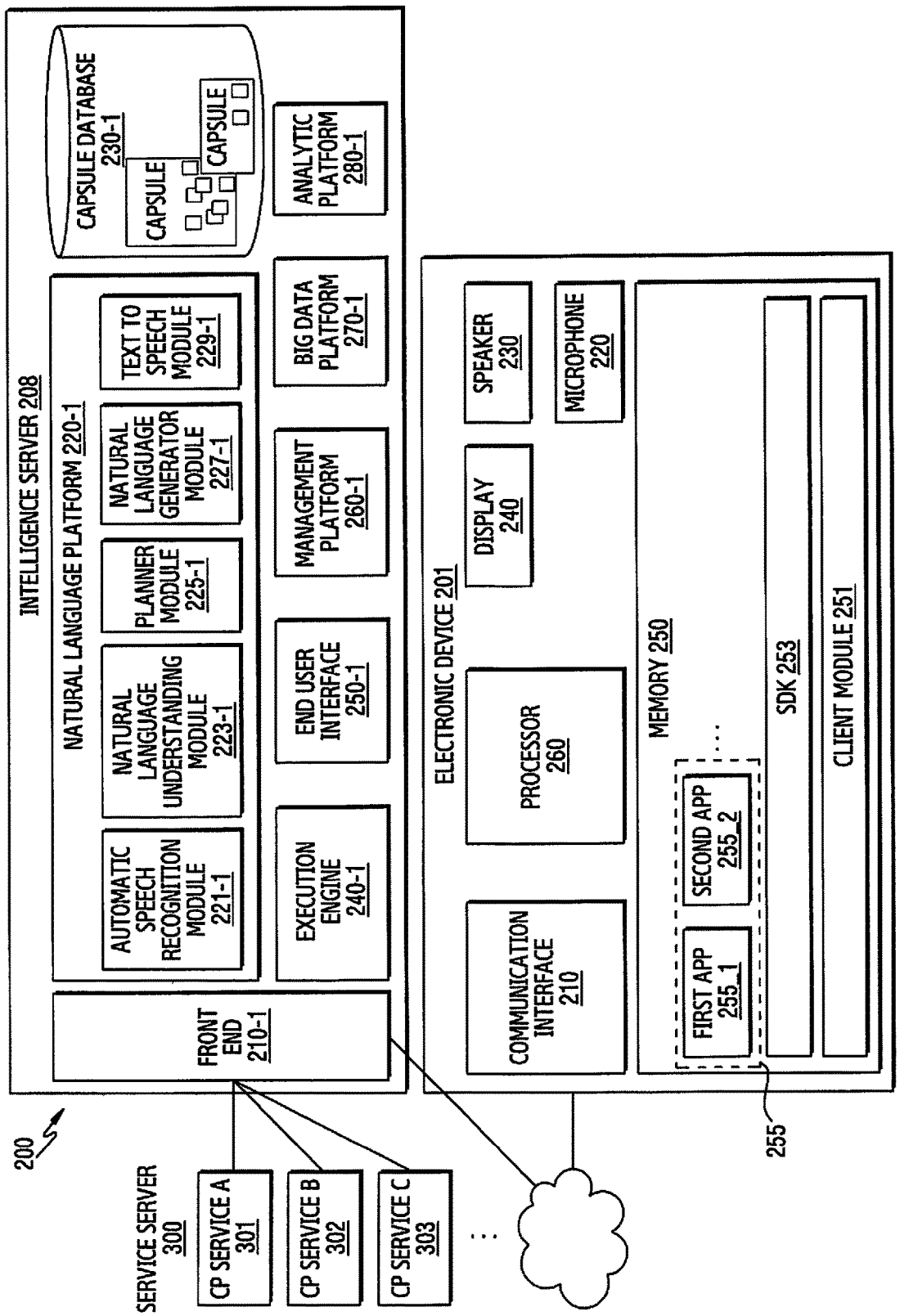
FIG. 2 is a block diagram of an integrated intelligence system according to an embodiment.

FIG. 2 is a block diagram of an integrated intelligence system 200 according to an embodiment.

Referring to FIG. 2, the integrated intelligence system 200 may include an electronic device 201, an intelligence server 208, and a service server 300.

The electronic device 201 may be a user terminal device (or an electronic device) capable of being coupled to the Internet and, for example, may be a portable phone, a smart phone, a personal digital assistant (PDA), a notebook computer, a television (TV), a home appliance, a wearable device, a head mounted device (HMD), or a smart speaker.

The electronic device 201 may include a communication interface 210, a microphone 220, a speaker 230, a display 240, a memory 250, or a processor 260. The enumerated constituent elements may be operatively or electrically coupled with each other.

The communication interface 210 may be configured to be coupled with an external device and transmit and/or receive data with the external device. The microphone 220 may receive sound (e.g., a user utterance) and convert the sound into an electrical signal. The speaker 230 may output an electrical signal as sound (e.g., a voice). The display 240 may be configured to display an image or a video. The display 240 may also display a graphical user interface (GUI) of an executed app (or an application program).

The memory 250 may store a client module 251, a software development kit (SDK) 253, and a plurality of apps 255. The client module 251 and the SDK 253 may configure a framework (or a solution program) for performing a generic function. In addition, the client module 251 or the SDK 253 may configure a framework for processing a voice input.

The plurality of apps 255 stored in the memory 250 may be a program for performing a designated function. The plurality of apps 255 may include a first app 255_1 and a second app 2552. The plurality of apps 255 may each include a plurality of actions for performing a designated function. For example, the apps may include an alarm app, a message app, and/or a schedule app. The plurality of apps 255 may be executed by the processor 260, and execute at least some of the plurality of actions in sequence.

The processor 260 may control a general operation of the electronic device 201. For example, the processor 260 may be electrically coupled with the communication interface 210, the microphone 220, the speaker 230, and the display 240, and perform a designated operation.

The processor 260 may also execute a program stored in the memory 250, and perform a designated function. For example, the processor 260 may execute at least one of the client module 251 or the SDK 253, and perform a subsequent operation for processing a voice input. The processor 260 may, for example, control operations of the plurality of apps 255 through the SDK 253. An operation of the client module 251 or the SDK 253 described below may be an operation by the execution of the processor 260.

The client module 251 may receive a voice input. For example, the client module 251 may receive a voice signal corresponding to a user utterance which is sensed through the microphone 220. The client module 251 may transmit the received voice input to the intelligence server 208. The client module 251 may transmit state information of the electronic device 201 to the intelligence server 208, together with the received voice input. The state information may be, for example, app execution state information.

The client module 251 may receive a result corresponding to the received voice input. For example, in response to the intelligence server 208 calculating a result corresponding to the received voice input, the client module 251 may receive the result corresponding to the received voice input from the intelligence server 208. The client module 251 may display the received result on the display 240.

The client module 251 may receive a plan corresponding to the received voice input. The client module 251 may display, on the display 240, a result of executing a plurality of actions of an app according to the plan. The client module 251 may, for example, display the result of execution of the plurality of actions in sequence on the display. The electronic device 201 may, for example, display only a partial result (e.g., a result of the last operation) of executing the plurality of actions on the display.

The client module 251 may receive a request for obtaining information necessary for calculating a result corresponding to a voice input, from the intelligence server 208. In response to the request, the client module 251 may transmit the necessary information to the intelligence server 208.

The client module 251 may transmit result information of executing a plurality of actions according to a plan, to the intelligence server 208. By using the result information, the intelligence server 208 may identify that the received voice input is processed correctly.

The client module 251 may include a voice recognition module. The client module 251 may recognize a voice input of performing a restricted function through the voice recognition module. For example, the client module 251 may perform an intelligence app for processing a voice input for performing a systematic operation through a designated input (e.g., "Wake up!")

The intelligence server 208 may receive information related with a user voice input from the electronic device 201 through a communication network. The intelligence server 208 may convert data related with the received voice input into text data. The intelligence server 208 may generate a plan for performing a task corresponding to the user voice input based on the text data.

The plan may be generated by an AI system. The AI system may be a rule-based system as well, and may be a neural network-based system (e.g., a feedforward neural network (FNN)) and/or a recurrent neural network (RNN)) as well. In addition, the AI system may be either a combination of the aforementioned systems or an AI system different from the aforementioned systems as well. The plan may be selected in a set of predefined plans or may be generated in real time in response to a user request. For example, the AI system may select at least one plan among a predefined plurality of plans.

The intelligence server 208 may transmit a result of the generated plan to the electronic device 201 or transmit the generated plan to the electronic device 201. The electronic device 201 may display the result of the plan on the display 240. The electronic device 201 may display a result of executing an action of the plan on the display 240.

The intelligence server 208 may include a front end 210-1, a natural language platform 220-1, a capsule database (DB) 230-1, an execution engine 240-1, an end user interface 250-1, a management platform 260-1, a big data platform 270-1, or an analytic platform 280-1.

The front end 210-1 may receive a voice input received from the electronic device 201. The front end 210-1 may transmit a response corresponding to the voice input.

The natural language platform 220-1 may include an automatic speech recognition module (ASR module) 221-1, a natural language understanding module (NLU module) 223-1, a planner module 225-1, a natural language generator (NLG) module 227 or a text to speech (TTS) module 229-1.

The automatic speech recognition module 221-1 may convert a voice input received from the electronic device 201 into text data. By using the text data of the voice input, the natural language understanding module 223-1 may grasp a user's intention. For example, by performing syntactic analysis or semantic analysis, the natural language understanding module 223-1 may grasp the user's intention. By using a linguistic feature (e.g., a syntactic factor) of a morpheme or phrase, the natural language understanding module 223-1 may grasp a meaning of a word extracted from a voice input, and match the grasped meaning of the word with the user's intention to identify the user's intention.

By using an intention and a parameter identified by the natural language understanding module 223-1, the planner module 225-1 may generate a plan. Based on the identified intention, the planner module 225-1 may identify a plurality of domains necessary for performing a task. The planner module 225-1 may identify a plurality of actions included in each of the plurality of domains which are identified based on the intention. The planner module 225-1 may identify a parameter necessary for executing the identified plurality of actions, or a result value outputted by the execution of the plurality of actions. The parameter and the result value may be defined with a concept of a designated form (or class). The plan may include the plurality of actions identified by the user's intention, and a plurality of concepts. The planner module 225-1 may identify a relationship between the plurality of actions and the plurality of concepts stepwise (or hierarchically). For example, based on the plurality of concepts, the planner module 225-1 may identify a sequence of execution of the plurality of actions that are identified based on the user intention. In other words, the planner module 225-1 may identify the sequence of execution of the plurality of actions, based on the parameter necessary for execution of the plurality of actions and the result outputted by execution of the plurality of actions. The planner module 225-1 may generate a plan including association information (e.g., an ontology) between the plurality of actions and the plurality of concepts. The planner module 225-1 may generate the plan by using information stored in a capsule database 230-1 in which a set of relationships between the concept and the action is stored.

The natural language generator module 227-1 may convert designated information into a text form. The information converted into the text form may be a form of natural language speech. The text to speech module 229-1 may convert the information of the text form into information of a voice form.

A partial function or whole function of a function of the natural language platform 220-1 may be implemented even in the electronic device 201.

The capsule database 230-1 may store information about a relationship between a plurality of concepts and actions corresponding to a plurality of domains. A capsule may include a plurality of action objects (or action information) and concept objects (or concept information) which are included in a plan. The capsule database 230-1 may store a plurality of capsules in a form of a concept action network (CAN). The plurality of capsules may be stored in a function registry included in the capsule database 230-1.

The capsule database 230-1 may include a strategy registry storing strategy information which is necessary for identifying a plan corresponding to a voice input. The strategy information may include reference information for, in response to there being a plurality of plans corresponding to a voice input, identifying one plan. The capsule database 230-1 may include a follow up registry storing follow-up operation information for proposing a follow-up operation to a user in a designated condition. The follow-up operation may include, for example, a follow-up utterance. The capsule database 230-1 may include a layout registry storing layout information of information outputted through the electronic device 201. The capsule database 230-1 may include a vocabulary registry storing vocabulary information included in capsule information. The capsule database 230-1 may include a dialog registry storing a user's dialog (or interaction) information. The capsule database 230-1 may update an object stored through a developer tool. The developer tool may include, for example, a function editor for updating an action object or a concept object. The developer tool may include a vocabulary editor for updating a vocabulary. The developer tool may include a strategy editor generating and registering a strategy of identifying a plan. The developer tool may include a dialog editor generating a dialog with a user. The developer tool may include a follow up editor which may edit a follow up speech activating a follow up target and providing a hint. The follow up target may be identified based on a currently set target, a user's preference or an environmental condition. The capsule database 230-1 may be implemented even in the electronic device 201.

The execution engine 240-1 may calculate a result by using the generated plan. The end user interface 250-1 may transmit the calculated result to the electronic device 201. The electronic device 201 may receive the result and provide the received result to a user. The management platform 260-1 may manage information used in the intelligence server 208. The big data platform 270-1 may collect a user's data. The analytic platform 280-1 may manage a quality of service (QoS) of the intelligence server 208. For example, the analytic platform 280-1 may manage an element and processing speed (or efficiency) of the intelligence server 208.

The service server 300 may provide a designated service (e.g., a food order or a hotel reservation via capsule (CP) service A 301, CP service B 302, and CP service C 303) to the electronic device 201. The service server 300 may be a server managed by a third party. The service server 300 may provide information for generating a plan corresponding to a received voice input to the intelligence server 208. The provided information may be stored in the capsule database 230-1. In addition, the service server 300 may provide result information of the plan to the intelligence server 208.

In the above-described integrated intelligence system 200, in response to a user input, the electronic device 201 may provide various intelligent services to the user. The user input may include, for example, an input through a physical button, a touch input or a voice input.

The electronic device 201 may provide a voice recognition service through an intelligence app (or a voice recognition app) stored therein. In this case, for example, the electronic device 201 may recognize a user utterance or a voice input received through the microphone 220, and provide a service corresponding to the recognized voice input to the user.

The electronic device 201 may perform a designated operation, singly, or together with the intelligence server 208 and/or the service server 300, based on a received voice input. For example, the electronic device 201 may execute an app corresponding to the received voice input and perform a designated operation through the executed app.

In response to the electronic device 201 providing a service together with the intelligence server 208 and/or the service server, the electronic device 201 may sense a user utterance by using the microphone 220, and generate a signal (or voice data) corresponding to the sensed user utterance. The electronic device 201 may transmit the voice data to the intelligence server 208 by using the communication interface 210.

As a response to a voice input received from the electronic device 201, the intelligence server 208 may generate a plan for performing a task corresponding to the voice input, or a result of performing an action according to the plan. The plan may include, for example, a plurality of actions for performing a task corresponding to a user's voice input, and a plurality of concepts related with the plurality of actions. The concept may be a definition of a parameter inputted by execution of the plurality of actions or a result value outputted by the execution of the plurality of actions. The plan may include association information between the plurality of actions and the plurality of concepts.

The electronic device 201 may receive the response by using the communication interface 210. The electronic device 201 may output a voice signal generated by the electronic device 201 to the external by using the speaker 230, or output an image generated by the electronic device 201 to the external by using the display 240.

Figure 3:
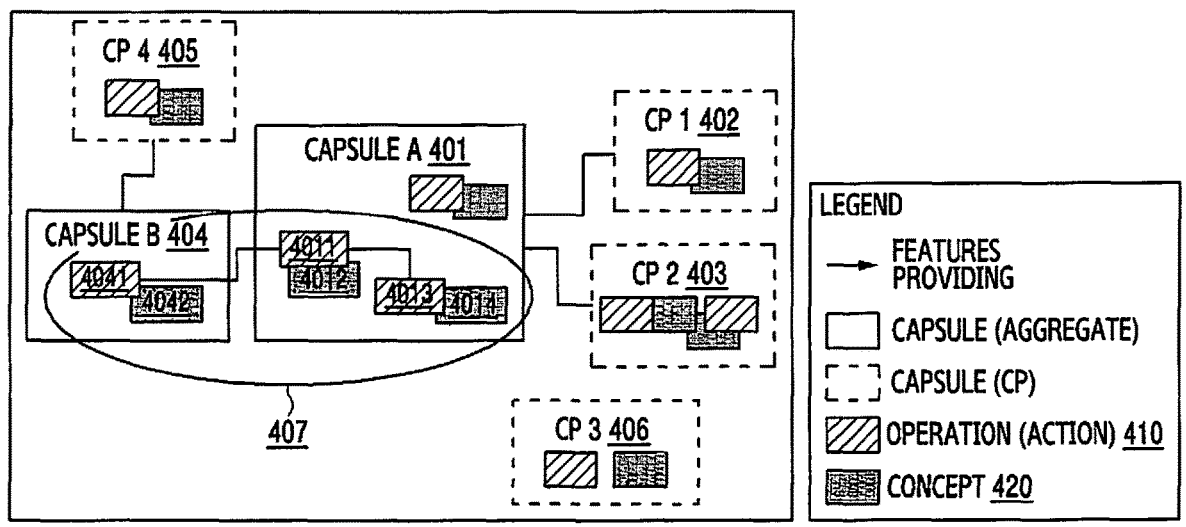
FIG. 3 is a diagram illustrating a type in which information regarding a relation between concepts and actions is stored in a database according to an embodiment.

FIG. 3 is a diagram illustrating a type in which information regarding a relation between concepts and actions is stored in a database, according to an embodiment.

Referring to FIG. 3, a capsule database 230-1 of the intelligence server 208 may store a capsule in the form of a CAN. The capsule database may store an action for processing a task corresponding to a user's voice input and a parameter necessary for the action, in the form of the CAN.

The capsule database may store a plurality of capsules (i.e., a capsule A 401 and a capsule B 404) corresponding to each of a plurality of domains (e.g., applications). One capsule (e.g., the capsule A 401) may correspond to one domain (e.g., a location (geo) and/or an application). In addition, one capsule may correspond to at least one service provider (e.g., a CP 1 402, a CP 2 403, a CP 4 405, or a CP 3 406) for performing a function of a domain related with the capsule. One capsule may include at least one or more actions 410 and at least one or more concepts 420, for performing a designated function.

By using a capsule stored in a capsule database, the natural language platform 220-1 may generate a plan for performing a task corresponding to a received voice input. For example, by using the capsule stored in the capsule database, the planner module 225-1 of the natural language platform 220-1 may generate the plan. For example, the planner module 225-1 may generate a plan 407 by using actions 4011 and 4013 and concepts 4012 and 4014 of the capsule A 401 and an action 4041 and concept 4042 of the capsule B 404.

Figure 4:
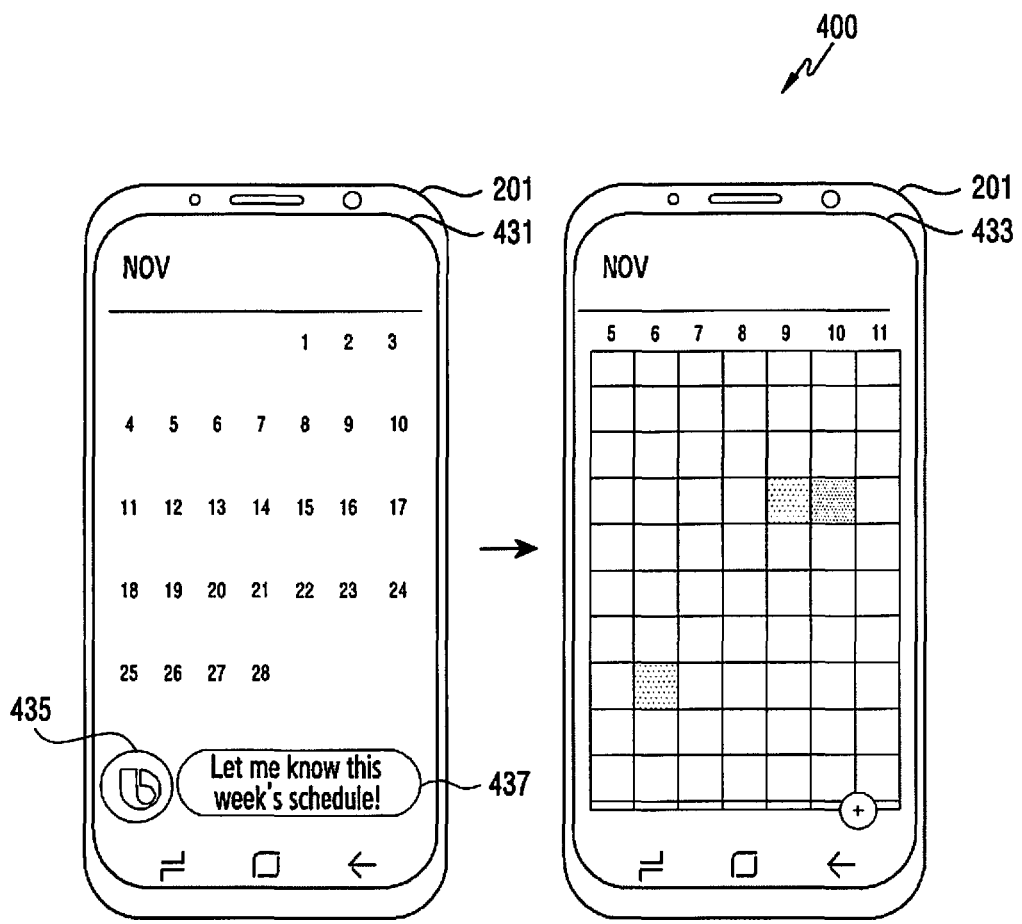
FIG. 4 is an illustration of an electronic device displaying a screen for processing a voice input received through an intelligent application (app) according to an embodiment.

FIG. 4 is an illustration 400 of an electronic device 201 displaying a screen for processing a voice input received through an intelligence app according to an embodiment.

Referring to FIG. 4, to process a user input through the intelligence server 208, the electronic device 201 may execute the intelligence app.

In a screen 431, in response to recognizing a designated voice input (e.g., "Wake up!") or receiving an input through a hardware key (e.g., a dedicated hardware key), the electronic device 201 may execute the intelligence app for processing the voice input. The electronic device 201 may, for example, execute the intelligence app in a state of executing a schedule app. The electronic device 201 may display an object (e.g., an icon) 435 corresponding to the intelligence app on the display 240. The electronic device 201 may receive a user input by the user's speech. For example, the electronic device 201 may receive a voice input "Let me know this week's schedule!". The electronic device 201 may display a user interface (UI) 437 (e.g., an input window) of the intelligence app in which text data of the received voice input is displayed on the display 240.

In screen 433, the electronic device 201 may display a result corresponding to the received voice input on the display. For example, the electronic device 201 may receive a plan corresponding to the received user input, and display, on the display 240, a schedule of this week according to the plan.

Figure 5:
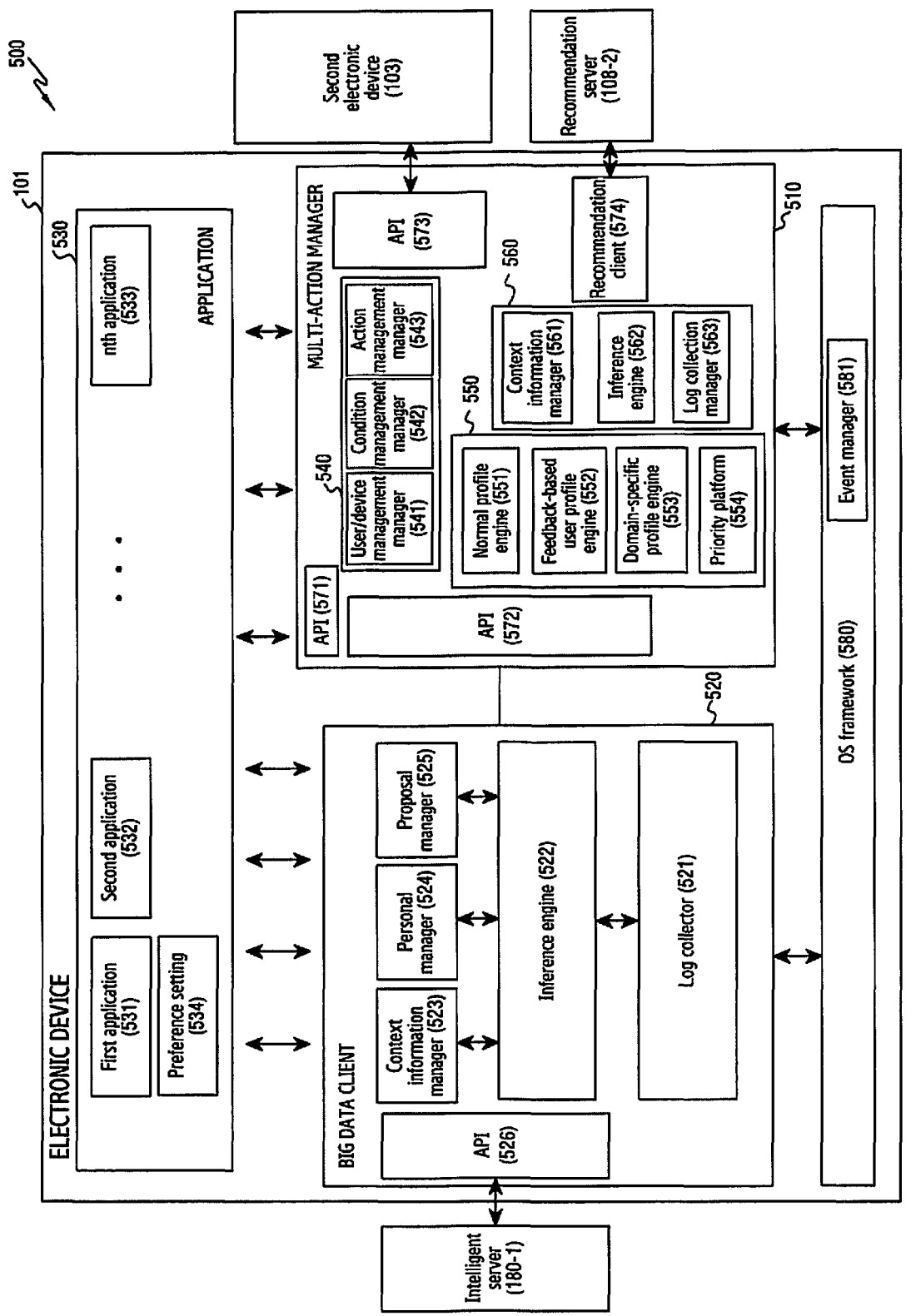
FIG. 5 is a block diagram of a system for providing a routine according to an embodiment.

FIG. 5 is a block diagram of a system 500 for providing a routine according to an embodiment.

The term "condition" may refer to a state (or context) of an electronic device 101 (or a user of the electronic device 101) configured such that the electronic device 101 performs an operation.

The term "action" may refer to an operation of the electronic device 101 performed when the electronic device 101 satisfies a condition. An action may be configured to correspond to a condition (or to be interlinked with a condition). The term "routine" may refer to a program including a definition of a condition and an action corresponding to the condition.

A routine may be configured by a user of the electronic device 101. For example, at least one of a condition or an action may be configured by the user of the electronic device 101. However, this example is not limiting in any manner, and a routine may be configured by a designer of the electronic device 101 or by a developer of an application.

Referring to FIG. 5, the system 500 for providing a routine may include the electronic device 101, a second electronic device 103 (or electronic device 102 and electronic device 104), and intelligent server 108-1 and recommendation server 108-2. The electronic device 101 may be at least partially identical or similar to the electronic device 101 in FIG. 1 or the electronic device 201 in FIG. 2.

The electronic device 101 may include a multi-action manager 510, a big data client 520, an application 530, and an OS framework 580.

The multi-action manager 510 may control overall operations for providing a routine.

The multi-action manager 510 may include a service management module 540, an analysis module 550 (or intelligence module), a log/context information management module 560, multiple application program interfaces (APIs) 571, 572, and 753, and a recommendation client 574.

The service management module 540 may include a user/device management manager 541, a condition management manager 542, and an action management manager 543.

The user/device management manager 541 may manage device context information of the electronic device 101. The device context information of the electronic device 101 may include information regarding the battery 189 of the electronic device 101, information regarding the processor 120 (e.g., a CPU) of the electronic device 101, or information regarding a device/network connected to the electronic device 101, or a combination thereof.

The condition management manager 542 may manage information regarding contexts, places, events, times, devices, and manuals.

The action management manager 543 may mange information regarding actions. For example, the action management manager 543 may manage information related to the configuration of actions.

The analysis module 550 may include a normal profile engine 551, a feedback-based user profile engine 552, a domain-specific profile engine 553, and a priority platform 554.

The normal profile engine 551 may generate a normal profile based on information received from the big data client 520.

The feedback-based user profile engine 552 may generate a feedback-based profile based on information regarding a feedback received from the big data client 520. For example, the feedback-based user profile engine 552 may generate a feedback-based profile by using a reinforcement learning scheme.

The domain-specific profile engine 553 may generate a domain-specific profile by distinguishing information received from the big data client 520 with regard to each domain. A domain may include health and intention extraction.

The priority platform 554 may generate a priority condition for determining a recommendation or a hint to be provided to the electronic device 101 based on a time, a place, and/or an occasion. The priority platform 554 may be a time/place/occasion (TPO)-based analyzer.

The log/context information management module 560 may include a context information manager 561, an inference engine 562, and a log collection manager 563. The context information manager 561 may store context information when a log of the electronic device 101 is collected. The inference engine 562 may generate information for recommending a routine. The log collection manager 563 may manage a log-collecting operation.

The API 571 may be configured such that information is transmitted/received between the multi-action manager 510 and the application 530.

The API 572 may be configured such that information is transmitted/received between the multi-action manager 510 and the big data client 520.

The API 573 may be configured such that information is transmitted/received between the multi-action manager 510 and the electronic device 103.

The recommendation client 574 may receive, from the recommendation server 108-2, information related to a routine recommended by the recommendation server 108-2 (for example, a routine recommendation list).

The big data client 520 may include a log collector 521, an inference engine 522, a context information manager 523, a personal manager 524, a proposal manager 525, and an API 526.

The log collector 521 may collect a log (or log data) of the electronic device 101. The log collector 521 may collect a log regarding the state (or state change) of the electronic device 101 resulting from a user input regarding the electronic device 101. The user input may include a voice input, a touch input, a button (or key) input, and/or an input through a remote controller. However, the user input is not limited to the above-mentioned examples.

The inference engine 522 may infer context information of the electronic device 101 (or user of the electronic device 101) from a user input and information collected by using a sensor module of the electronic device 101. The inference engine 522 may infer context information of the electronic device 101 (or the user of the electronic device 101) at least partially based on a log of the electronic device 101 collected through the log collector 521. For example, the inference engine 522 may infer the location of the user's home or company or location-related context information (for example, in the process of going to the office/leaving the office, traveling, or driving).

The context information manager 523 may collect context information of the electronic device 101. For example, the context information manager 523 may collect context information of the electronic device 101 inferred through the inference engine 522.

The context information manager 523 may deliver the collected context information to the proposal manager 525.

The personal manager 524 may manage personal information of the user of the electronic device 101. For example, the personal manager 524 may collect the user's personal information at least partially based on context information of the electronic device 101 inferred by using the inference engine 522. The personal information of the user of the electronic device 101 may include information regarding the result of operation of an application executed by the electronic device 101 or information regarding the current state of the electronic device 101.

The personal manager 524 may deliver the personal information of the user of the electronic device 101 to the proposal manager 525.

The personal manager 524 may transmit at least a part of the user's personal information to the intelligent server 108-1. The personal manager 524 may transmit at least a part of personal information of the user accumulated for a designated period (for example, one month) to the intelligent server 108-1.

The proposal manager 525 may predict the user's intention and may deliver a hint or information necessary for the electronic device 101 to execute an operation for the user to the multi-action manager 510. For example, the proposal manager 525 may deliver information to the multi-action manager 510 in view of the user's current state (for example, time, place, occasion, application in use, etc.).

The proposal manager 525 may deliver, to the multi-action manager 510, a hint or information necessary for the electronic device 101 to execute an operation based on context information of the electronic device 101 collected through the context information manager 523, personal information of the user of the electronic device electronic device 101 received through the personal manager 524, and context information of the user inferred through the inference engine 522.

The API 526 may be configured such that information is transmitted/received between the big data client 520 and the intelligent server 108-1.

The application 530 may include multiple applications 531, 532, and 533. The application may include a preference setting 534.

Each of the multiple applications 531, 532, and 533 may include an SDK. The SDK included in each of the multiple applications 531, 532, and 533 may define information regarding a condition and an action that each of the multiple applications 531, 532, and 533 can support. For example, the SDK may include information regarding a function that can be configured as a condition of an application, and regarding a function that an application can configure as an action. The SDK may play the role of an interface between the application 530 and the multi-action manager 510. For example, the SDK may include information regarding a communication method for transmitting/receiving information between the application 530 and the multi-action manager 510.

The OS framework 580 may include an event manager 581. The event manager 581 may monitor the state of the system of the electronic device 101. The event manager 581 may deliver information regarding a change in the state of the system of the electronic device 101 (or system event) to the multi-action manager 510. The event manager 581 may detect a change in the state of the electronic device 101 configured as a condition, and may deliver information regarding the detected change in the state of the electronic device 101 to the multi-action manager 510.

The multi-action manager 510, the bag data client 520, and the OS framework 580 in FIG. 5 may be at least partially included in the processor 120 of FIG. 1.

The second electronic device 103 may transmit/receive information related to a routine with the electronic device

101. When the second electronic device 103 has received information related to a routine from the electronic device 101, the second electronic device 103 may perform an operation for executing the routine. Operations of the second electronic device 103 performing an operation for executing a routine at least partially based on information regarding the routine received from the electronic device 101 is described below in greater detail.

The intelligent server 108-1 may manage at least a part of personal information of the user of the electronic device 101 periodically received from the personal manager 524. The intelligent server 108-1 may perform a function at least partially identical or similar to the function performed by the intelligence server 208 in FIG. 2.

The recommendation server 108-2 may generate a recommended routine and may transmit information regarding the generated recommended routine (for example, routine recommendation list) to the recommendation client 574. The recommendation server 108-2 may generate a routine to be recommended to the electronic device 101 based on information regarding another electronic device (for example, the second electronic device 103) or regarding the user of another electronic device. The recommendation server 108-2 may transmit a recommended routine generated based on information regarding another electronic device or regarding the user of another electronic device 101 to the recommendation client 574.

Figure 6:
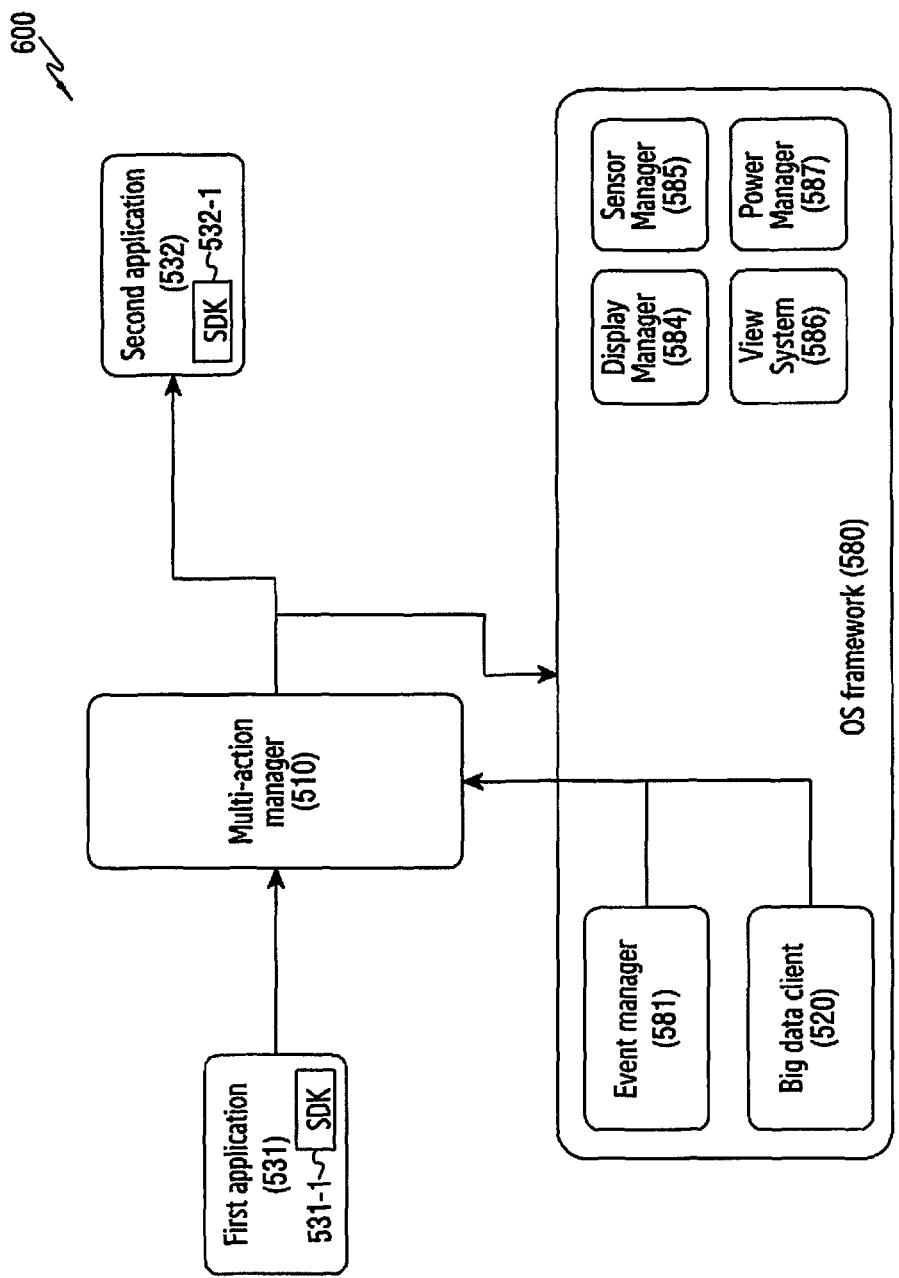
FIG. 6 is a block diagram of a method for executing a routine of an electronic device according to an embodiment.

FIG. 6 is a block diagram 600 of a method for executing a routine of an electronic device according to an embodiment.

Referring to FIG. 6, a case is illustrated in which a condition is configured with regard to a first application 531, and an action is configured with regard to a second application 532.

The multi-action manager 510 may configure a condition related to the first application 531 through an SDK 531-1 included in the first application 531. The SDK 531-1 may define information regarding a condition that the first application 531 can support. For example, the SDK 531-1 may include information regarding a function that can be configured as a condition of the first application 531. When an input for configuring a condition has been inputted from the user, the multi-action manager 510 may acquire information regarding a function that can be configured as a condition of the first application 531 from the first application 531 through the SDK 531-1.

The multi-action manager 510 may configure an action related to the second application 532 through an SDK 532-1 included in the second application 532. The SDK 532-1 may define information regarding an action that the second application 532 can support. For example, the SDK 532-1 may include information regarding a function that can be configured as an action of the second application 532. When an input for configuring an action is received from the user, the multi-action manager 510 may acquire information regarding a function that can be configured as an action of the second application 532 from the second application 532 through the SDK 532-1.

The multi-action manager 510 may configure at least one of a condition or an action, based on information acquired from the OS framework 580. For example, the multi-action manager 510 may configure at least one of a condition or an action related to the system, at least partially based on information regarding the system acquired from the OS framework 580. For example, the multi-action manager 510 may configure at least one of a condition or an action related to a context, at least partially based on information regarding a context acquired from the big data client 520.

However, the method of the multi-action manager 510 configuring at least one of a condition or an action is not limited to the above-mentioned examples.

If a routine is generated (or configured), the multi-action manager 510 may store information regarding the generated routine (or at least one of a condition or an action) in the database of the multi-action manager 510.

If a condition related to context information is configured, for example, the multi-action manager 510 may register information for confirming whether or not the configured condition is satisfied, or an event indicating, if the configured condition is satisfied, satisfaction of the configured condition, in the big data client 520. The multi-action manager 510 may receive an event related to a configured condition (for example, an event indicating that the condition is satisfied) from the first application 531 through the SDK 531-1. The multi-action manager 510 may receive an event related to a condition configured with regard to the system from the event manager 581. The multi-action manager 510 may receive an event related to a condition configured with regard to context information from the big data client 520.

The multi-action manager 510 may receive an event related to a condition and then confirm an action corresponding to the condition (or interlinked with the condition). The multi-action manager 510 may perform an operation for performing the action corresponding to the condition. For example, the multi-action manager 510 may deliver information necessary to perform an action through the SDK 532-1 to the second application 532. For example, the multi-action manager 510 may deliver information for performing an action (for example, an action related to a display, a sensor, a view interface, or a battery) to the OS framework 580 (for example, display manager 584, sensor manager 585, view system 586, or power manager 587). However, the operations of the multi-action manager 510 performing an action corresponding to a condition and the constituent elements included in the OS framework 580 are not limited to the above-mentioned examples.

A method for an electronic device 101 providing a routine is described below in greater detail with reference to FIG. 7 to FIG. 27.

According to an embodiment, an electronic device includes a user interface; at least one processor operably coupled to the user interface; and a memory operably coupled to the at least one processor. The memory may be configured to store instructions that, when executed, cause the at least one processor to determine, when the electronic device is in a first state, whether or not a first condition is satisfied; perform a first action of changing a state of the electronic device from the first state to a second state if the first condition is satisfied; receive, through the user interface, a user input of changing the state of the electronic device from the second state to a third state; change the state of the electronic device from the second state to the third state at least partially based on the received user input; and maintain the third state even if the first condition is not satisfied in the third state.

The electronic device may further include at least one of a communication interface or a sensor module, and the instructions may be configured to cause the at least one processor to determine whether or not the first condition is satisfied, at least partially based on data acquired by at least one of the communication interface or the sensor module.

The instructions may be configured to cause the at least one processor to generate a first routine including the first condition and the first action.

The instructions may be configured to cause the at least one processor to display information indicating that the first routine is being executed, if the first condition is satisfied, through the user interface, in a lock state of the electronic device.

The instructions may be configured to cause the at least one processor to display detailed information regarding the first routine, at least partially based on a user input regarding the information indicating that the first routine is being executed.

The instructions may be configured to cause the at least one processor to generate the first routine that is executable, in the lock state of the electronic device.

The instructions may be configured to cause the at least one processor to acquire a log related to a state changed in the electronic device if the first condition is satisfied, for a designated period of time; determine a second action related to the state changed in the electronic device, at least partially based on the log; and recommend the second action.

The instructions may be configured to cause the at least one processor to acquire information regarding a pattern of a user of the electronic device for a designated period of time; generate a second routine at least partially based on the information regarding the pattern of the user of the electronic device; recommend the second routine if a second condition included in the second routine is different from the first condition; and output a notification through the user interface such that, if the second condition is identical to the first condition, and if a second action included in the second routine is different from the first action, the first routine additionally includes the second action.

The instructions may be configured to cause the at least one processor to display information related to the first routine through the user interface by using a quick panel.

According to an embodiment, an electronic device includes a user interface; at least one processor operably coupled to the user interface; and a memory operably coupled to the at least one processor. The memory may be configured to store instructions that, when executed, cause the at least one processor to determine, when the electronic device is in a first state, whether or not a first condition is satisfied; perform a first action of changing a state of the electronic device from the first state to a second state if the first condition is satisfied; determine whether or not a second condition is satisfied when the electronic device is in the second state; perform a second action of changing the state of the electronic device from the second state to a third state if the second condition is satisfied; maintain the state of the electronic device in the third state if the second condition is satisfied but the first condition is no longer satisfied, when the electronic device is in the third state; and restore the state of the electronic device from the third state to the first state if the first condition and the second condition are no longer satisfied, when the electronic device is in the third state.

The electronic device may further include at least one of a communication interface or a sensor module, and the instructions may be configured to cause the at least one processor to determine whether or not the first condition and the second condition are satisfied, at least partially based on data acquired by at least one of the communication interface or the sensor module.

The instructions may be configured to cause the at least one processor to restore the state of the electronic device from the third state to the first state, which is immediately before the first condition is satisfied, if the second condition is not satisfied while the electronic device maintains the third state because the second condition is satisfied but the first condition is no longer satisfied.

The instructions may be configured to cause the at least one processor to restore the state of the electronic device from the third state to the second state if the first condition is satisfied but the second condition is no longer satisfied when the electronic device is in the third state.

According to an embodiment, an electronic device includes a communication interface configured to perform wireless communication; at least one processor operably coupled to the communication interface; and a memory operably coupled to the at least one processor. The memory may be configured to store instructions that, when executed, cause the at least one processor to receive information related to a first routine including a first action that is executed if a first condition is satisfied, by using the communication interface, from an external electronic device; determine whether or not the first action can be performed if the first condition is satisfied when the electronic device is in a first state, at least partially based on the received information related to the first routine; store the first routine and the first state in the memory if the first action can be performed; perform the first action so as to change the first state to a second state, after storing the first routine and the first state; and return to the first state after the first action is performed.

The information related to the first routine may include at least one of package information related to determining whether or not the first condition is satisfied, tag information including a key value designated to distinguish the first condition, or parameter information including a detailed configuration value regarding the tag information.

The first action may use at least one of package information related to the first action, tag information including a key value designated to distinguish the first action, or parameter information including a detailed configuration value regarding the tag information.

The instructions may be configured to cause the at least one processor to receive information necessary to perform the first action from a different electronic device through the communication interface, if the first action cannot be performed.

The instructions may be configured to cause the at least one processor to change a part of the information related to the first routine at least partially based on information related to a user of the electronic device; and generate a second routine at least partially based on the changed part of the information.

The instructions may be configured to cause the at least one processor to acquire information regarding a first place inputted from a user, while performing an operation for configuring the first routine; and receive information recommending a routine related to the first place, through the communication interface, from the external electronic device.

The instructions may be configured to cause the at least one processor to determine a second place as a point of interest of a user of the electronic device, at least partially based on log information of the electronic device; and receive a routine related to the second place, through the communication interface, from the external electronic device related to the second place, when the electronic device is positioned at the second place.

Figure 7:
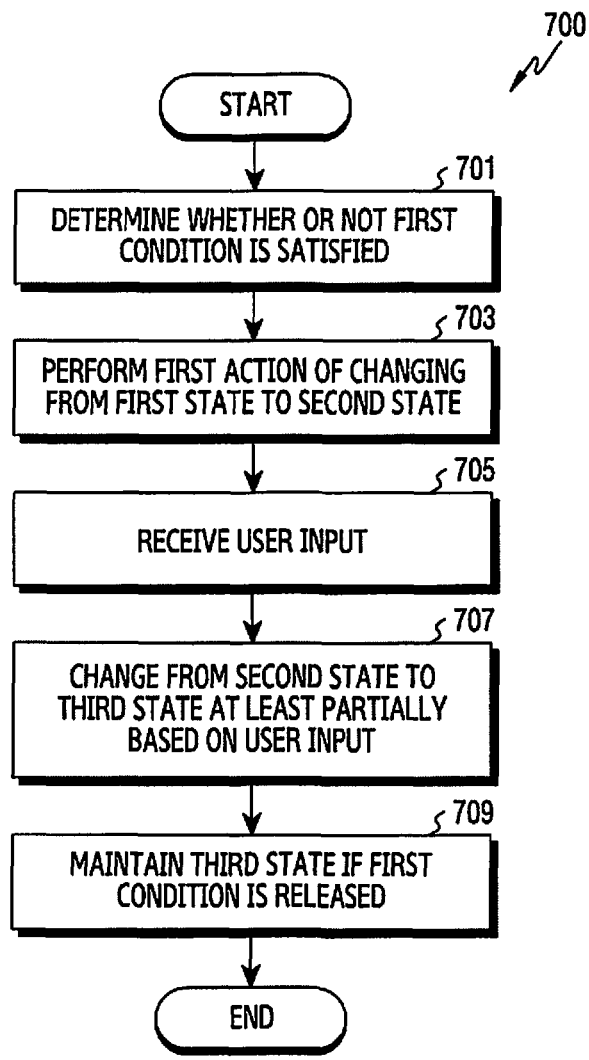
FIG. 7 is a flowchart of a method for restoring a state of an electronic device after a routine is executed, according to an embodiment.

FIG. 7 is a flowchart 700 of a method for restoring a state of the electronic device 101 after a routine is executed, according to an embodiment.

Referring to FIG. 7, in step 701, the processor 120 (for example, the multi-action manager 510) may determine, when the electronic device 101 is in a first state, whether or not a first condition is satisfied.

The processor 120 may confirm, while a first routine is activated, whether or not a first condition configured for the first routine is satisfied. The first routine may be generated (or configured) so as to perform a first action of changing the state of the electronic device 101 to a second state, if the first condition is satisfied.

The processor 120 may confirm whether or not the first condition configured for the first routine is satisfied, at least partially based on an event received from the SDK of the application, an event received from the big data client 520, or an event received from the event manager 581.

The processor 120 may store information regarding the first state in the memory 130. For example, if the first condition is "coming home", and if the first action is "setting the volume level to 100", then the processor 120 may store a state value of the electronic device 101 before the first action is performed (for example, volume level 50), so as to correspond to the first condition, in the memory 130.

In step 703, the processor 120 may perform, when it has been determined that the first condition is satisfied, a first action of changing the state of the electronic device 101 from the first state to a second state (for example, volume level 100).

The processor 120 may cause the application, for which the first action is configured, to perform the first action, through the SDK. The processor 120 may cause a system operation, which has been configured as the first action, to be performed.

In step 705, the processor 120 may receive a user input of changing the state of the electronic device 101 from the second state to a third state through the user interface of the electronic device 101. For example, the processor 120 may receive a user input (for example, user input of changing the volume level to 75) of changing the state of the electronic device 101 from the second state (for example, volume level 100), which is a state after the first action is performed, to a third state (for example, volume level 75).

In step 707, in an embodiment, the processor 120 may change the state of the electronic device 101 from the second state to the third state, at least partially based on the user input.

The processor 120 may store the third state in the memory 130.

In step 709, the processor 120 may maintain the third state if the first condition is released (or if the first condition is no longer satisfied).

If the first condition is released (for example, if "coming home" is configured as the first condition, and if the electronic device 101 is positioned outside home), the processor 120 may compare the second state (e.g., volume level 100) immediately after the first action is performed with the current state (or the third state) (for example, volume level 75). If the second state and the current state are not identical, the processor 120 may maintain the current state (or the third state). If the second state and the current state are identical (for example, if the second state is the current state, or if no user input for a change to the third state is received), the processor 120 may change (or restore) the state of the electronic device 101 to the first state (for example, volume level 50) immediately before the first action is performed.

If an action configured for a routine is performed since a condition configured for the routine is satisfied, if the state of the electronic device 101 is changed by a user input, and if the condition configured for the routine is then released, the electronic device 101 may maintain the state of the electronic device 101 changed by the user input, not the state immediately before the action is performed, thereby reflecting the user's intention.

Figure 8:
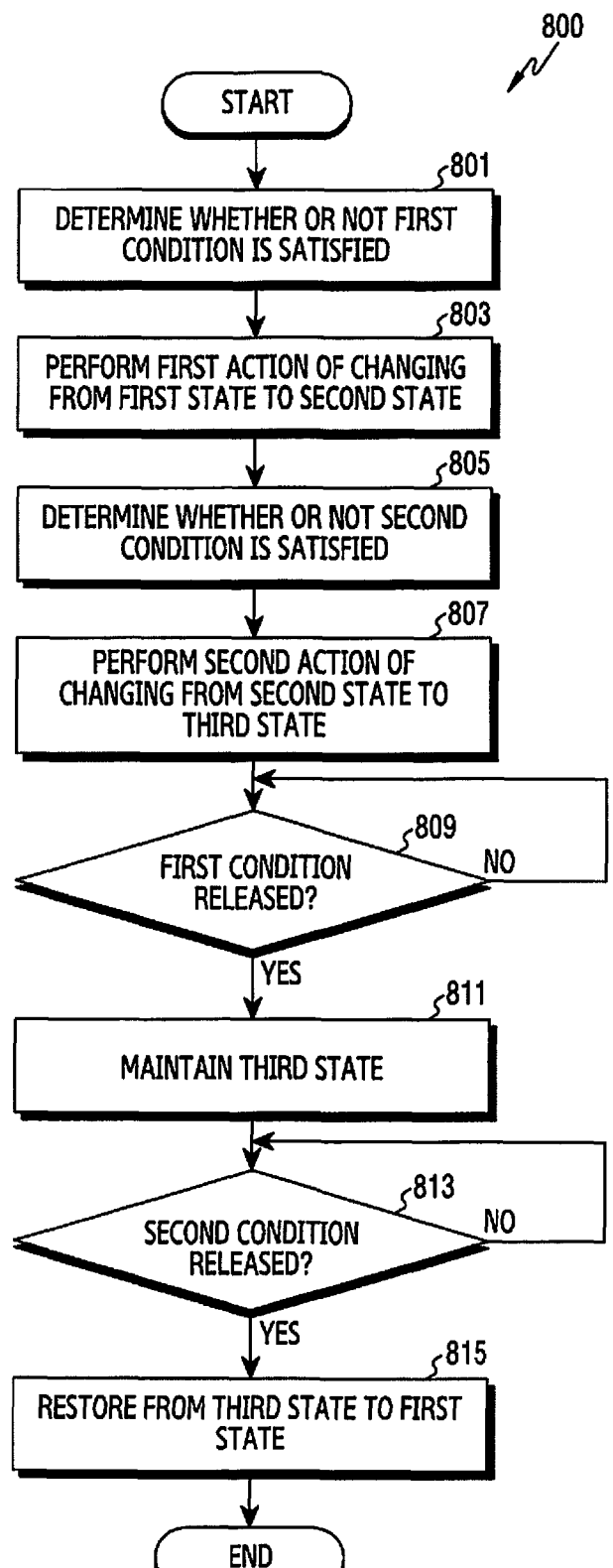
FIG. 8 is a flowchart of a method for restoring a state of an electronic device after multiple routines are executed, according to an embodiment.

FIG. 8 is a flowchart 800 of a method for restoring a state of the electronic device 101 after multiple routines are executed, according to an embodiment.

FIG. 9 is a chart 900 of a method for restoring a state of an electronic device after multiple routines are executed, according to an embodiment.

Referring to FIG. 8 and FIG. 9, in step 801, the processor 120 (for example, multi-action manager 510) may determine whether or not a first condition is satisfied, when the electronic device 101 is in a first state.

The processor 120 may confirm, while a first routine is activated, whether or not a first condition configured for the first routine is satisfied. The first routine may be generated (or configured) so as to perform a first action of changing the state of the electronic device 101 to a second state, if the first condition is satisfied.

The processor 120 may confirm whether or not a first condition configured for the first routine is satisfied, at least partially based on an event received from the SDK of the application, an event received from the big data client 520, or an event received from the event manager 581.

The processor 120 may store information regarding the first state in the memory 130. For example, if the first condition is "coming home", and if the first action is "setting the volume level to 100", then the processor 120 may store a state value of the electronic device 101 before the first action is performed (for example, volume level 50), so as to correspond to the first condition (for example, A1 in FIG. 9), in the memory 130.

In step 803, the processor 120 may perform, when it has been determined that the first condition is satisfied, a first action of changing the state of the electronic device 101 from the first state to a second state (for example, volume level 100).

The processor 120 may cause the application, for which the first action is configured, to perform the first action, through the SDK. The processor 120 may cause a system operation, which has been configured as the first action, to be performed.

In step 805, in an embodiment, the processor 120 (for example, multi-action manager 510) may determine whether or not a second condition is satisfied, when the electronic device 101 is in a second state.

The processor 120 may confirm, while a second routine is activated, whether or not a second condition configured for the second routine is satisfied. The second routine may be generated (or configured) so as to perform a second action of changing the state of the electronic device 101 to a third state, if the second condition is satisfied, in step 807. For example, the second condition (for example, A2 in FIG. 9) may be "if the time is anytime from 12 o'clock AM to 6 o'clock PM", and the second action may be "set the volume level to 0". The third state may be a state of "volume level 0".

The processor 120 may store information regarding the state (for example, the second state) immediately before the second action is performed, if the second condition is satisfied, in the memory 130.

In step 809, the processor 120 may confirm whether or not the first condition is released (or whether or not the first condition is no longer satisfied).

In step 811, the processor 120 may maintain the third state (or current state) (for example, volume level 0) if the first condition satisfied prior to the second condition is released prior to the second condition (for example, if the first condition having a lesser timestamp in 910 of FIG. 9 (or satisfied at an earlier time) is released prior to the second condition having a greater timestamp).

If the first condition is released prior to the second condition, the processor 120 may delete information regarding the state related to the first action of the first condition, as in 920 of FIG. 9. The processor 120 may change (or update) the state value immediately before the second action of the second condition is performed (or state value prior to the second action) (for example, volume level 100) to the state value immediately before the first action of the first condition is performed (or value regarding the first state) (for example, volume level 50), as illustrated in 920 of FIG. 9. The state value immediately before the second action of the second condition is performed may be the state value of the electronic device 101, which is to be restored if the second condition is released.

In step 813, the processor 120 may confirm whether or not the second condition is released (or whether or not the second condition is no longer satisfied). For example, if the second condition is "if the time is anytime from 12 o'clock AM to 6 o'clock PM", the processor 120 may confirm whether or not the current time is past 6 o'clock PM.

In step 815, the processor 120 may restore the state of the electronic device 101 from the third state to the first state, if the second condition is released. For example, the processor 120 may restore the state of the electronic device 101 to the state value immediately before the first action of the first condition is performed, which has been changed in step 813 (for example, volume level 50), as illustrated in 920 of FIG. 9.

FIG. 8 and FIG. 9 illustrate a case in which the first condition satisfied prior to the second condition is released prior to the second condition, but the present disclosure is not limited thereto. For example, if the second condition is satisfied after the first condition is satisfied, and if the second condition satisfied at a later time than the first condition is released first, the state of the electronic device 101 may be restored (or changed) from the third state (for example, volume level 0) to the second state (for example, volume level 100). If the first condition is released after the second condition is released, the state of the electronic device 101 may be restored from the second state to the first state (for example, volume level 50).

FIG. 8 and FIG. 9 illustrate a case assuming two conditions (e.g., first and second conditions), but the present disclosure is not limited thereto. For example, multiple routines may be configured such that there are N conditions different from each other, where the N different conditions correspond to actions of changing to different states of the same function (for example, volume adjustment function), respectively. In this case, if the first condition to the $N^{th}$ condition are successively satisfied, and if the $M^{th}$ (M<N) condition is then released first, the processor 120 may delete information regarding the state related to the action of the $M^{th}$ condition. The processor 120 may change (or update) the state value immediately before the action of the $(M+1)^{th}$ condition (immediately next to the $M^{th}$ condition) is performed to the state value immediately before the action of the $M^{th}$ condition is performed. The state value immediately before the action of the $(M+1)^{th}$ condition is performed may be the state value of the electronic device 101, which is to be restored if the $(M+1)^{th}$ condition is released.

The state of the electronic device 101 may be restored based on the method described above with reference to FIG. 8 and FIG. 9, after executing multiple routines, such that the state of the electronic device 101 desired by the user is maintained.

Figure 10:
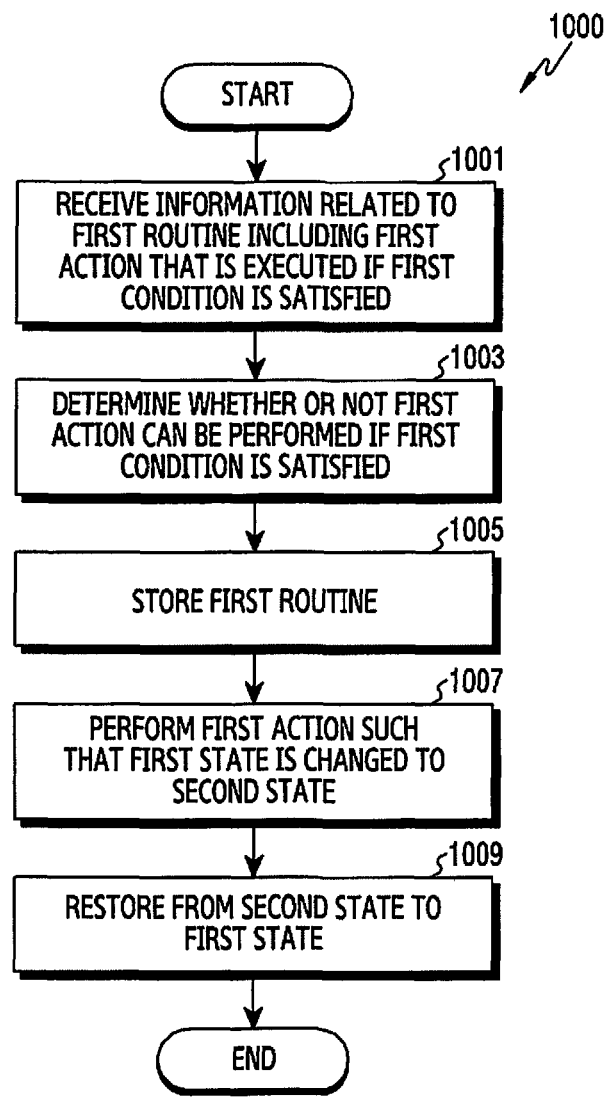
FIG. 10 is a flowchart of a method for providing a routine, by an electronic device according to an embodiment, based on information regarding a routine received from another electronic device.

FIG. 10 is a flowchart 1000 of a method for providing a routine, by an electronic device 101, based on information regarding a routine received from an external electronic device.

Referring to FIG. 10, in step 1001, the processor 120 may receive information related to a first routine including a first action, which is executed if a first condition is satisfied, from an external electronic device by using the communication module 190.

The information related to the first routine may include at least one of package information, tag information, or parameter information including a detailed configuration value regarding the tag information.

The package information may include information related to determining whether or not the first condition related to the first routine is satisfied. The package information may include an identification (ID) of the application for which the first condition related to the first routine is configured. The package information may include the ID of the application for which the first action corresponding to the first condition is configured.

The tag information may include a key value designated to distinguish the first condition related to the first routine from other conditions. The tag information may include a key value designated to distinguish the first action corresponding to the first condition from other actions.

The parameter information may be information necessary to perform the first action. The parameter information may be a detailed information value regarding the tag information. The parameter information may not be received from an external electronic device if the parameter information corresponds to personal information of the user of the electronic device 101 or corresponds to information that must be configured separately for each user.

In step 1003, the processor 120 may determine whether or not the first action can be performed, if the first condition is satisfied when the electronic device 101 is in the first state, at least partially based on the received information related to the first routine.

The processor 120 may determine whether or not the electronic device 101 can execute the first routine. For example, the processor 120 may determine whether or not the application, for which the first condition of the first routine is configured, is installed in the electronic device 101. If it is confirmed that the application for which the first condition of the first routine is configured is not installed in the electronic device 101, the processor 120 may receive information for installing (or downloading) the application for which the first condition is configured from the server, at least partially based on the information related to the first routine, thereby installing the application for which the first condition is configured. For example, the processor 120 may determine whether or not an application for which the first action corresponding to the first condition of the first routine is configured is installed in the electronic device 101. If it is confirmed that the application for which the first action corresponding to the first condition of the first routine is configured is not installed in the electronic device 101, the processor 120 may receive information for installing the application for which the first action is configured from the server 108, at least partially based on the information related to the first routine, thereby installing the application for which the first action is configured.

In step 1005, the processor 120 may store the first routine and the first state in the memory 130 if it is determined that the first action can be performed.

The processor 120 may change the first routine such that the same corresponds to information related to the user of the electronic device 101 (or the same is appropriate, personalized, or customized). For example, the processor 120 may change a part of the received information regarding the first routine so as to correspond to information related to the user of the electronic device 101.

The processor 120 may change the information related to the first condition. For example, if the first condition is "coming home", the processor 120 may change (or configure) the home location coordinate, which is the context information of the user of the electronic device 101, to the home location coordinate of the user of the electronic device 101.

The processor 120 may change the information related to the first action. For example, if the first action is "connecting the electronic device 101 to a vehicle through Bluetooth", the processor 120 may change information regarding the Bluetooth device of the vehicle to information regarding the Bluetooth device of the user of the electronic device 101.

The processor 120 may change information regarding at least one of the first condition or the first action, at least partially based on history information of the user of the electronic device 101 (or user pattern information). For example, the processor 120 may check information regarding the application (or type of the application) (for example, a music application) related to the first action (or an application for which the first action is configured), at least partially based on information regarding the routine. The processor 120 may change the first action such that, if it is confirmed that the user of the electronic device 101 frequently uses a certain music application, and if the first condition is satisfied, the certain music application is executed.

If the information related to the first routine is changed, the processor 120 may store the changed first routine in the memory 130, at least partially based on the changed information related to the first routine.

If it is confirmed that there is no need to change the first routine, the processor 120 may store the first routine in the memory 130 without changing the first routine.

In step 1007, in an embodiment, the processor 120 may store the first routine and the first state and may then perform the first action such that the first state is changed to a second state. Step 1007 is at least partially identical or similar to step 703 in FIG. 7, and a detailed description thereof is omitted here.

In step 1009, the processor 120 may perform an operation of restoring from the second state to the first state. Step 1009 is at least partially identical or similar to step 709 in FIG. 7, and a detailed description thereof is omitted here.

Figure 11:
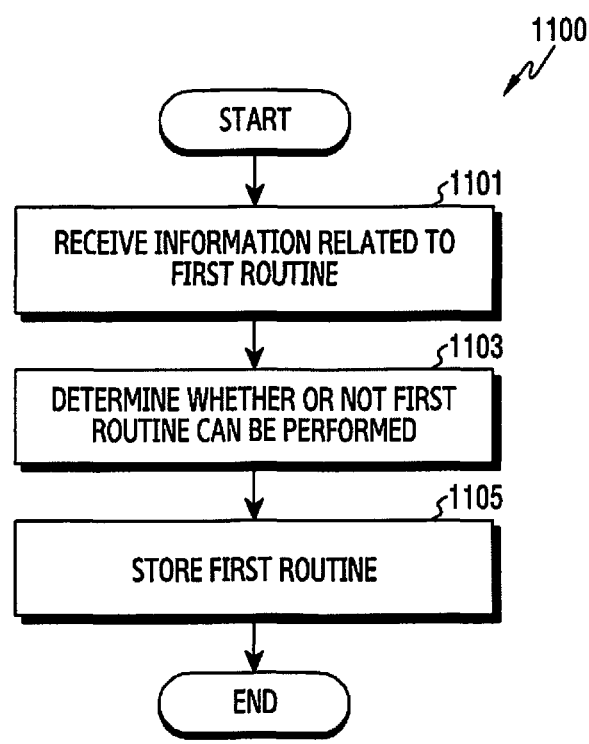
FIG. 11 is a flowchart of a method for providing a routine, by an electronic device according to an embodiment, based on information regarding a routine received from another electronic device.

FIG. 11 is a flowchart 1100 of a method for providing a routine, by an electronic device 101 according to an embodiment, based on information regarding a routine received from another electronic device.

Referring to FIG. 11, in step 1101, the processor 120 may receive information related to a first routine from an external electronic device by using a communication module 190.

The processor 120 may receive information related to the first routine from an external electronic device, at least partially based on the user's input. For example, the processor 120 may receive information related to the first routine, at least partially based on a user input (for example, user input for confirming (or allowing) reception of information related to the first routine) regarding a message (for example, information related to the first routine or uniform resource locator (URL) for receiving the first routine) including information regarding the first routine, which is received while the electronic device 101 transmits/receives messages with the other external electronic device by using a messenger application (for example, a chatting application). However, the method for receiving information related to the first routine from the external electronic device, at least partially based on the user's input, is not limited to the above-mentioned example.

The processor 120 may receive information related to the first routine from the external electronic device 101 based on context information. For example, if the electronic device 101 is positioned at a certain place (for example, at a place included in the search history of the user of the electronic device 101), the processor 120 may receive information related to the first routine (for example, a routine configured such that a condition to be positioned at a certain place and an action related to a service provided at the certain place are performed) from an external electronic device 101 disposed at the certain place (for example, communication device disposed at a coffee shop) or from an external electronic device related to the certain place (for example, a server providing a service related to an amusement park). However, the method for receiving information related to the first routine from an external electronic device based on context information is not limited to the above-described example.

The information related to the first routine may include at least one of package information, tag information, or parameter information including a detailed configuration value regarding the tag information. A description of the information related to the first routine is at least partially identical or similar to the description of step 1001 in FIG. 10, and a detailed description thereof is omitted here.

In step 1103, the processor 120 may determine whether or not the first routine can be performed, at least partially based on the received information related to the first routine. For example, the processor 120 may determine whether or not an application for which the first condition of the first routine is configured is installed in the electronic device 101. If it is confirmed that no application for which the first condition of the first routine is configured is installed in the electronic device 101, the processor 120 may receive information for installing the application for which the first condition is configured from the server, at least partially based on information related to the first routine, thereby installing the application for which the first condition is configured. For example, the processor 120 may determine whether or not an application for which the first action corresponding to the first condition of the first routine is configured is installed in the electronic device 101. If it is confirmed that no application for which the first action corresponding to the first condition of the first routine is configured is installed in the electronic device 101, the processor 120 may receive information for installing the application for which the first action is configured from the server, at least partially based on information related to the first routine, thereby installing the application for which the first action is configured.

In step 1105, the processor 120 may store the first routine if it is determined that the first routine can be performed.

The processor 120 may change the first routine such that the first routine corresponds to the electronic device 101 (or user of the electronic device 101) (or the first routine is appropriate, personalized, or customized). The processor 120 may change a part of the received information regarding the first routine so as to correspond to the electronic device 101.

The processor 120 may change the information related to the first condition. The processor 120 may change information regarding at least one of the first condition or the first action, at least partially based on history information of the user of the electronic device 101 (or user pattern information).

If the information related to the first routine is changed, the processor 120 may store the changed first routine in the memory 130 at least partially based on the changed information related to the first routine.

If it is confirmed that there is no need to change the first routine, the processor 120 may store the first routine in the memory 130 without changing the first routine.

Figure 12:
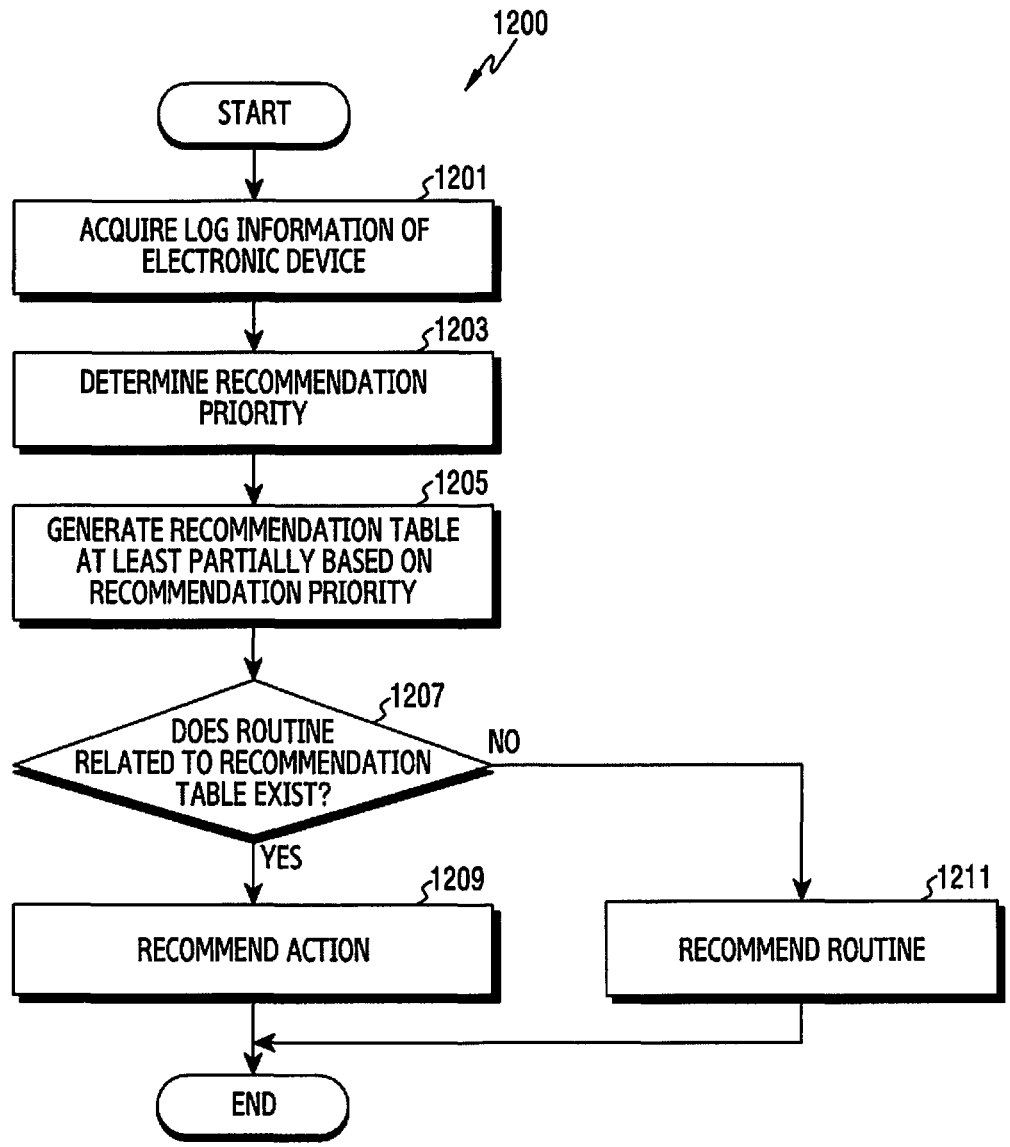
FIG. 12 is a flowchart of a method for recommending a routine of an electronic device according to an embodiment.

FIG. 12 is a flowchart 1200 of a method for recommending a routine of an electronic device according to an embodiment.

Referring to FIG. 12, in step 1201, the processor 120 (for example, the big data client 520 or the multi-action manager 510) may acquire log information of the electronic device 101.

The log information may include information regarding at least one of the TPO context, time, place, occasion, contents, hint, user profile, TPO preference, or wearable data synchronization.

The TPO context may include finish working, work, working, near home, home, commuting to work, before wakeup time, probably asleep, before bedtime, and frequently visited place.

The time may include sleep statistics, commutation statistics, and exercise statistics. The sleep statistics may be information necessary to analyze the user's sleeping pattern, and may include daytime, sleeping time, and wakeup time. For example, the sleep statistics may include the date (for example, December 19$^{th}$), the day (for example, Wednesday), sleeping time (for example, 00:55:06), wakeup time (for example, 06:41:05). The commutation statistics may include daytime, confidence, home departure, company arrival, company departure, and home arrival.

The place may include information related to visits, place analysis, vehicle analysis, traveling information analysis, living space, nation information, and Wi-Fi analysis. For example, the information related to visits may include visit information and geofence information. The visit information may include the time, category, and place type. The geofence information may include the place ID, category, place type, geofence ID, and state-related information. The information related to place analysis may include information regarding the ID, category, latitude, longitude, and confidence. The information related to vehicle analysis may include information regarding the name, device address, and confidence. The information related to traveling analysis may include information regarding the state, starting time, ending time, confidence, and whether or not the end has come. The information related to living space may include information regarding location information of locations frequently visited by the user. The nation information may include information regarding the place type, current location, home, and time. The information related to Wi-Fi analysis may include information regarding a service set ID (SSID), a basic SSID (BASSID), category, place type, and confidence.

The occasion may include information related to a driving log, commutation analysis, wakeup time, refresh log, working log, studying log, and moving into/out of home. The information related to the driving log may include information regarding global positioning system (GPS) information, time, automobile, and state. The information related to commutation analysis may include information regarding the time, state, and confidence. The information related to wakeup time may include information regarding the wakeup time, reference time, and confidence. The information related to the refresh log may include information regarding the starting time, ending time, state, and confidence. The information related to the working log may include information regarding the starting time, ending time, state, and confidence. The information related to the studying log may include information regarding the starting time, ending time, state, and confidence. The information related to moving into/out of home may include information regarding the state, place ID, place type, additional information, and time.

The contents may include information related to recent matters of interest, preferred contacts (integrated/recommended), preferred apps (integrated/recommended), preferred settings, preferred places, preferred music, preferred music genres, preferred music artists, preferred websites, preferred domains, preferred data, preferred devices, and preferred charging. Information related to the recent matters of interest may include information regarding short-term preferred apps, short-term preferred contacts, short-term preferred music, and short-term preferred music artists. Information related to the preferred contacts may include information regarding time-specific, place-specific, names and confidence. Information related to the preferred apps may include information regarding time-specific, place-specific, names and confidence, and information regarding preferred apps by rank gap and app groups. Information related to the preferred settings may include information regarding time-specific, place-specific, names and confidence, and sleep time, commuting, TPO, names, and confidence. Information related to the preferred places may include information regarding time-specific names and confidence. Information related to the preferred music may include information regarding time-specific, place-specific tracks, albums, and confidence. Information related to the preferred music genres may include information regarding time-specific, place-specific, genres and confidence. Information related to the preferred music artists may include information regarding time-specific, place-specific artists and confidence. Information related to the preferred websites may include information regarding time-specific preferred websites, place-specific preferred websites, URLs, and confidence. Information related to the preferred domains may include information regarding time-specific preferred domains, place-specific preferred domains, and confidence. Information related to the preferred data may include information regarding text messages, telephone calls, email, names, and confidence. Information related to the preferred devices may include information regarding time-specific preferred devices, place-specific preferred devices, device names, and confidence. Information related to the preferred charging may include information regarding the charging level, time-specific preferred charting types, place-specific preferred charging types, names, and confidence.

The user profile may include information related to an analyzed user profile, a relation user profile, a feedback demography, and a feedback interest.

The TPO preference may include information related to app TPO preference, setting TPO preference, music TPO preference, and exercise TPO preference.

The wearable data synchronization may include information related to gear (for example, name of a wearable device produced by Samsung Electronics™) data synchronization, and gear service status. The gear data synchronization may include information regarding an analyzed place, commuting pattern information, and sleep pattern information. The analyzed place of the gear data synchronization may include information regarding the ID, category, latitude, longitude, and confidence. The commuting pattern information of the gear data synchronization may include information regarding the week type, confidence, home out, work in, work out, and home in. The sleep pattern information of the gear data synchronization may include information regarding the week type, confidence, bedtime, and wakeup. The gear service status may include information regarding basic information, sleep time status, and TPO context history. The basic information of the gear service may include item and data information. The sleep time status of the gear service may include information regarding the date, day of week, bedtime, and wakeup. The TPO context history of the gear service may include information regarding the time, TPO context, and confidence.

In step 1203, the processor 120 may determine recommendation priority. For example, the processor 120 may determine recommendation priority in order to generate a recommendation list for recommending at least one of the condition or action of a routine.

The method for determining recommendation priority in step 1203 is described below in greater detail with reference to FIG. 13.

Figure 13:
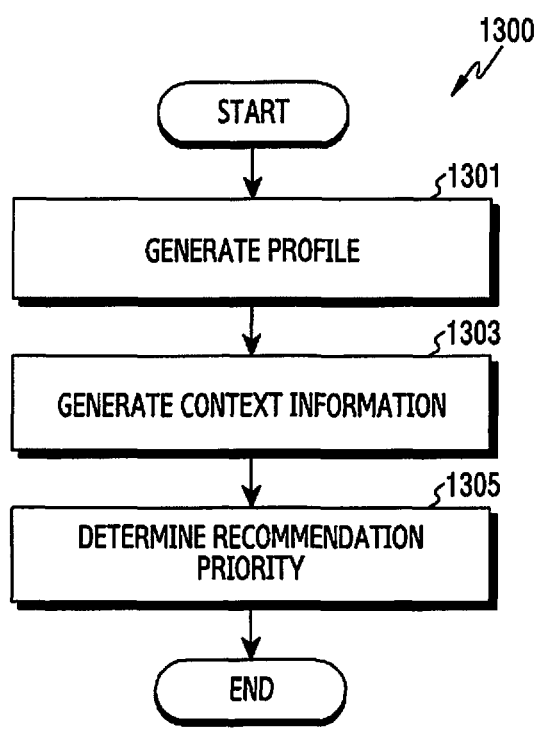
FIG. 13 is a flowchart of a method for determining a recommendation priority of an electronic device according to an embodiment.

FIG. 13 is a flowchart 1300 of a method for determining a recommendation priority of an electronic device according to an embodiment.

Referring to FIG. 13, in step 1301, the processor 120 may generate a profile at least partially based on acquired log information.

The processor 120 may generate a profile at least partially based on a possible function table, a user usage-based table, and a context information table.

The possible function table may be a table defining functions that the electronic device 101 can define as routines.

An example of the possible function table is given in Table 1 below:

TABLE 1

| Application | Possible functions |
| --- | --- |
| Gallery application | Automatic story making, image analysis, customized services, getting notifications, location information display, view option |
| Telephone application | Hiding contacts without numbers, telephone mode, blocking incoming calls, quick reject messages, international call setup, call receiving and hanging up, counterpart information display, call notifications, voice call protection, call recording, hearing aid use, roaming assistance |
| Message application | Notifications (urgent notifications, normal notifications), number and message blocking, spams, urgent notifications (urgent disasters, safety, disaster warning), customized services, website preview |
| Internet application | Quick Response (QR) reader, bookmarks, night mode turning-on, content blocking function, character sizes, content blocking, video assistance, quick execution menu, tracking blocking |

TABLE 1-continued

| Application | Possible functions |
| --- | --- |
| S Note application | S PEN preset, favorite pen, pen type, pen pressure type, pen color |
| Samsung Note application | S PEN preset, favorite pen, pen type, pen pressure type, pen color, screen off memo pen type |
| Camera application | Moving image size, image stabilization, object tracking autofocus (AF), high dynamic range (HDR), location tags, face shape compensation, camera mode imaging method, quick execution, imaging composition guide, scene-specific optimized imaging, notification of compensation during imaging, motion photos when imaging button is long pressed, storage option |
| Samsung Pay | Quick execution (lock screen, home screen, turned-off screen), fingerprint sensor gesture, intelligent scan, irises, fingerprints, nearby shop benefits, marketing information events, locations |
| S Health application | Measurement unit, notifications, accessories, marketing information, connected services, exercise recognition, together |
| Voice recording | Recording quality, stereo recording, blocking incoming calls during recording, storage location, voice recording information |
| Email | View, automatically fitting content to screen, notifications, spam addresses, split view |
| Smart Sync | Invitation acceptance, Smart Things panel, notifications, location information usage, cloud control, Wi-Fi and Bluetooth auto-execution, allowing recognition when mobile phone is nearby |
| DMB | Storage list, DMB auto-ending, smart DMB execution, channel information |
| Galaxy Watch | Notification setup, apps, widgets, sounds and vibrations, displays, useful functions, adding contents at locations |
| Notification | Notifications, notifying again, Bixby briefing, notifying sounds, vibrations |
| World time | World time, weather information update, weather setup |
| Timer | Timer time setup |
| Calendar | View type, calendar management, week starting day, notifications, reminder setup, time zone fixing |
| Samsung Music | My music, connect with mobile data, tab configuration, display music control on lock screen, playback speed, play music on turned-off screen, automatic turning-off timer, automatic volume control, skipping mute, current playlist setup, streaming sound quality selection, repeated song deletion, library playback list retrieval, Edge lighting, similar station playback |

The user usage-based table may include information regarding recent matters of interest, preferred contacts (integrated/recommended), preferred apps (integrated/recommended), preferred settings, preferred places, preferred music, preferred music genres, preferred music artists, preferred websites, preferred domains, preferred data, preferred devices, and preferred charging.

The context information table may include finish working, work, working, near home, home, commuting to work, before wakeup time, probably asleep, before bedtime, and frequently visited place.

The profile may include a place profile, a behavior profile, and a user profile. For example, the place profile may include information regarding home, workplace, cars, frequently visited places, and user-entered places. The behavior profile may include information regarding the sleeping time and the commuting time. The user profile may include categories and keywords that interest the user, and service-specific user profiles.

In step 1303, the processor 120 may generate context information. The context information may be context information of the electronic device 101. The processor 120 may combine the generated profile and log information of the electronic device 101, thereby generating context information of the electronic device 101.

The context information may include place context information and occasion context information. For example, the place context information may include information regarding the inside of a place, the outside of the place, the periphery of the place, exceptional places, whether a place is domestic or not, and overseas travels. The context information may include information regarding context before going to bed, after going to bed, before commuting, after commuting, during commuting, before driving, after driving, during driving, and weather.

In step 1305, the processor 120 may determine recommendation priority. The recommendation priority may include normal priority, service-specific priority, and proposals. For example, the normal priority may include an application preference, a contract preference, a setting preference, a place preference, a music preference, URLs, and search keywords. The service-specific priority may include an Internet of Things (IOT) preference and a service preference.

Referring to FIG. 12, in step 1205, the processor 120 may generate a recommendation table at least partially based on the recommendation priority.

An example of the recommendation table including the recommendation priority is given in Table 2 below:

TABLE 2

| Context information type | Examples | Priority |
|---|---|---|
| User occasion | User's schedule, event predicted by user's behavior pattern | 1 |
| Occasion | Waking up, before going to bed, attending time, ending time, traveling, overseas | 2 |
| Place | Inside home, outside home, inside company, outside company, inside car, outside car, overseas | 3 |
| Time | AM (6 AM-11 AM o'clock), lunch (11 AM-1 PM o'clock), PM (1 PM-6 PM o'clock), evening (6 PM-11 PM o'clock), night (11 PM-6 AM o'clock), etc. | 4 |
| Application | View contents, selected multiple items, etc. | 5 |

However, the recommendation table including recommendation priority is not limited to Table 2 above.

In step 1207, the processor 120 may confirm whether or not a routine related to the recommendation table is pre-stored (or pre-generated) in the electronic device 101. For example, the processor 120 may confirm whether or not a routine related to the recommendation table (for example, a routine including a condition included in the recommendation table) has previously been generated (or configured) by the user of the electronic device 101.

In step 1209, if it is confirmed that a routine related to the recommendation table is pre-stored in the electronic device 101, the processor 120 may recommend an action. For example, if it is confirmed that a routine including a condition included in the recommendation table is pre-stored in the electronic device 101, the processor 120 may output a notification to indicate that an additional action can be configured so as to correspond to the condition included in the recommendation table (or to be performed if the condition is satisfied).

In step 1211, if it is confirmed that no routine related to the recommendation table is pre-stored in the electronic device 101, the processor 120 may recommend a routine. For example, if it is confirmed that no routine related to the recommendation table is pre-stored in the electronic device 101, the processor 120 may output a notification to indicate that a routine can be generated.

Figure 14:
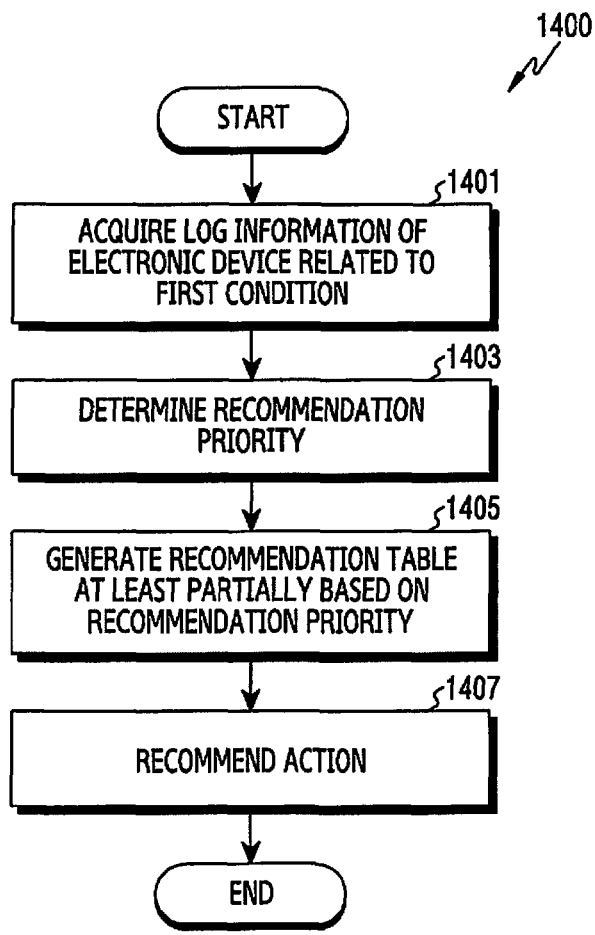
FIG. 14 is a flowchart of a method for recommending an action at least partially based on an already-generated routine of an electronic device according to an embodiment.

FIG. 14 is a flowchart 1400 of a method for recommending an action at least partially based on a pre-generated routine of an electronic device according to an embodiment.

Referring to FIG. 14, in step 1401, the processor 120 may acquire log information of the electronic device 101 related to the first condition of a pre-generated routine.

The processor 120 may cause the first action corresponding to the first condition to be performed, if the first condition is satisfied. The processor 120 may acquire information regarding the state of the electronic device 101, which is changed when the first action is performed as the first condition is satisfied (or information regarding a function performed together when the first action is performed).

The state of the electronic device 101, which is changed when the first action is performed as the first condition is satisfied, may be related to a function frequently used by the user of the electronic device 101 when the first condition is satisfied.

In addition to the information regarding the state of the electronic device 101, which is changed when the first action is performed as the first condition is satisfied, the processor 120 may additionally acquire information regarding the state of the electronic device 101, which is changed if the first condition is released after the first condition is satisfied. The processor 120 may consider both the information regarding the state of the electronic device 101, which is changed when the first action is performed as the first condition is satisfied, and the information regarding the state of the electronic device 101, which is changed if the first condition is released after the first condition is satisfied, thereby determining more accurately the function frequency used by the user of the electronic device 101 when the first condition is satisfied.

The log information of the electronic device 101 may include at least a part of the log information of the electronic device 101 described above in connection with step 1201 in FIG. 12.

In step 1403, the processor 120 may determine recommendation priority at least partially based on the log information of the electronic device 101 related to the first condition.

In step 1405, the processor 120 may generate a recommendation table at least partially based on the recommendation priority.

Step 1403 and step 1405 are at least partially identical or similar to step 1203 and step 1205 in FIG. 12, respectively, and a detailed description thereof is omitted here.

In step 1407, the processor 120 may recommend an action. The processor 120 may output a notification to indicate that an additional action (for example, function frequency used by the user of the electronic device 101 when the first condition is satisfied) may be configured so as to correspond to a condition included in the recommendation table (or to be performed if the condition is satisfied), at least partially based on the generated recommendation table.

Figure 15:
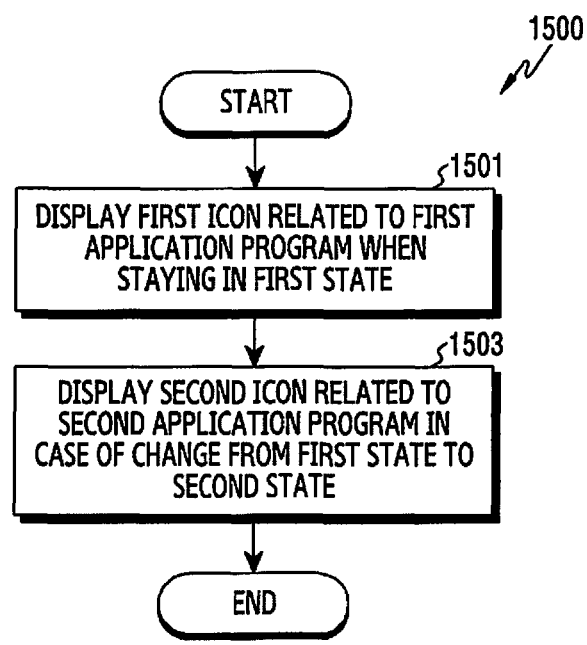
FIG. 15 is a flowchart of a method for displaying an icon in a lock state of an electronic device according to an embodiment.

FIG. 15 is a flowchart 1500 of a method for displaying an icon in a lock state of an electronic device 101 according to an embodiment.

Referring to FIG. 15, in step 1501, the processor 120 may display a first icon related to a first application program when the electronic device 101 is in a first state, through the display device 160, in a lock (or locked) state of the electronic device 101. For example, the processor 120 may display a lock screen user interface including a first icon related to a first application program when the electronic device 101 is in a first state, through the display device 160, in a lock state of the electronic device 101.

The processor 120 may determine a first icon to be displayed while the electronic device 101 is in the lock state. The processor 120 may determine a first application program to be displayed during the lock state, from application programs that the electronic device 101 can execute, at least partially based on the frequency of use of application programs executed in the first state of the electronic device 101 (for example, while the electronic device 101 is positioned home of the user). For example, the processor 120 may determine two application programs having a high frequency of use in the first state of the electronic device 101 as first application programs. The processor 120 may determine at least one application most recently used in the first state of the electronic device 101, among application programs that the electronic device 101 can execute, as the first application program. After the first application program is determined, the processor 120 may display a lock screen user interface including a first icon corresponding to the first application program, through the display device 160.

The processor 120 may display the first icon in a designated area of the display device 160. For example, the processor 120 may display the first icon in the bottom area of the display device 160. However, the area of the display device 160 in which the first icon is displayed is not limited to the bottom area of the display device 160.

The processor 120 may display a lock screen user interface including the first icon related to the first application program, in the lock state of the electronic device 101, at least partially based on the routine. For example, if the first condition of the routine is "if the state of the electronic device 101 becomes a first state", and if the first action corresponding to the first condition is "in the lock state, display the first icon corresponding to the first application and the second icon corresponding to the second application", then the processor 120 may display a lock screen user interface including the first icon corresponding to the first application and the second icon corresponding to the second application through the display device 160, if the state of the electronic device 101 becomes the first state (or if the first condition is satisfied). For example, if the first condition of a pre-generated routine is "if the state of the electronic device 101 becomes a first state", and if the first action corresponding to the first condition is "in the lock state, display icons corresponding two applications most frequently used among the first to the $N^{th}$ application", then the processor 120 may display a lock screen user interface including icons corresponding two applications most frequently used among the first to the $N^{th}$ applications, through the display device 160, if the state of the electronic device 101 becomes the first state (or if the first condition is satisfied). However, the method for displaying icons in the lock state is not limited to the above-mentioned examples. For example, the processor 120 may configure the lock screen user interface display function such that at least one application icon selected by the user is displayed in the lock state.

The processor 120 may display information related to a routine currently executed (for example, routine configured such that, as a first condition is satisfied, a first action corresponding to the first condition is currently executed), through the display device 160, in the lock state. For example, the processor 120 may display information indicating that a first routine is currently executed, in the lock state, through the display device 160. For example, if multiple routines are currently executed in the lock state, the processor 120 may display information regarding the routine executed most recently (or last), among the multiple routines (for example, information indicating that the most recently executed routine is currently executed), through the display device 160.

In step 1503, if the state of the electronic device 101 is changed from the first state to the second state, the processor 120 may display the second icon related to the second application program, instead of the first icon, through the display device 160. For example, the processor 120 may display a lock screen user interface including the second icon related to the second application program, when the electronic device 101 is in the second state, through the display device 160, in the lock state of the electronic device 101.

The operation of the processor 120 displaying the second icon in the second state, changed from the first state, is at least partially identical or similar to the operation of the processor 120 displaying the first icon in the first state in step 1501, and a detailed description thereof is omitted here.

Figure 16:
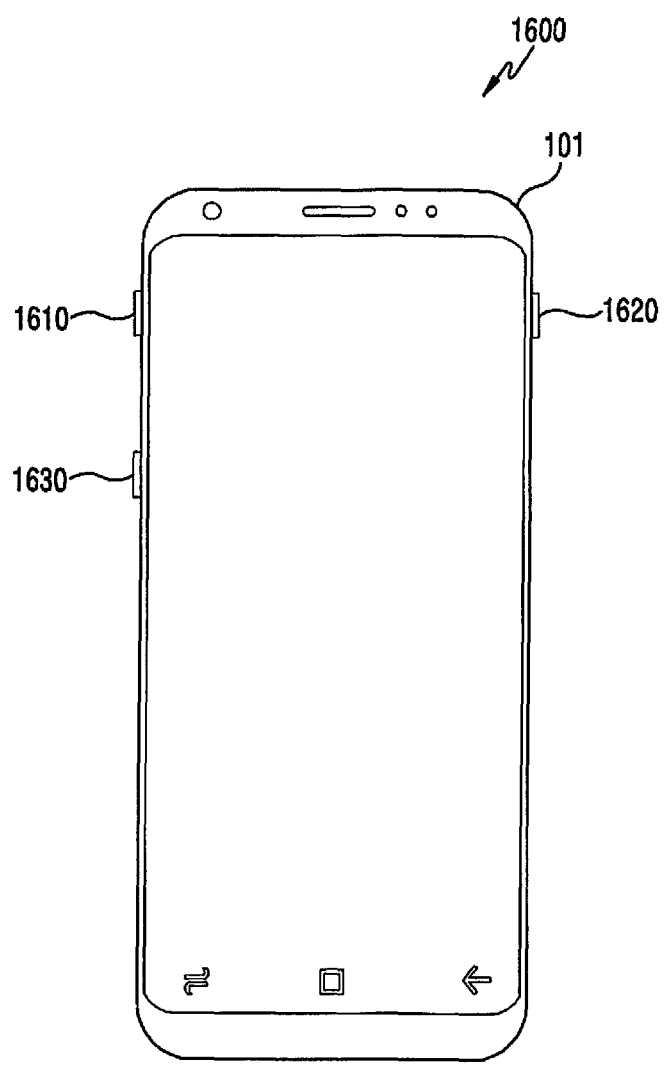
FIG. 16 is an illustration of a routine related to a hardware key of an electronic device according to an embodiment.

FIG. 16 is an illustration 1600 of a routine related to a hardware key of an electronic device according to an embodiment.

Referring to FIG. 16, the processor 120 may configure an input related to a hardware key as a condition of a routine. For example, the electronic device 101 may include a hardware key 1610 related to a volume adjustment function, a hardware key 1620 related to a power supply function, and a hardware key 1630 related to a voice command (or recognition) function (for example, Bixby™ button). The processor 120 may configure an input regarding the hardware key 1630 related to the voice command function as a condition, at least partially based on a user input, and may generate (or configure) a routine such that at least one action (for example, flash light execution, music playback, camera execution, emergency calling, or making a phone call to an electronic device 101 of a designated user) is performed so as to correspond to the condition (or if the condition is satisfied).

In an embodiment, the processor 120 may generate a routine by combining a condition related to an input regarding a hardware key and another condition. For example, the processor 120 may generate a routine such that an input regarding the hardware key 1630 related to the voice command function is configured as a first condition, executing a phone call function is configured as a second condition, and an operation of making a call to a specific contact if the first and second conditions are satisfied is configured as an action. However, the generation of a routine based on combination of a condition related to an input regarding a hardware key and another condition is not limited to the above-described examples.

Figure 17:
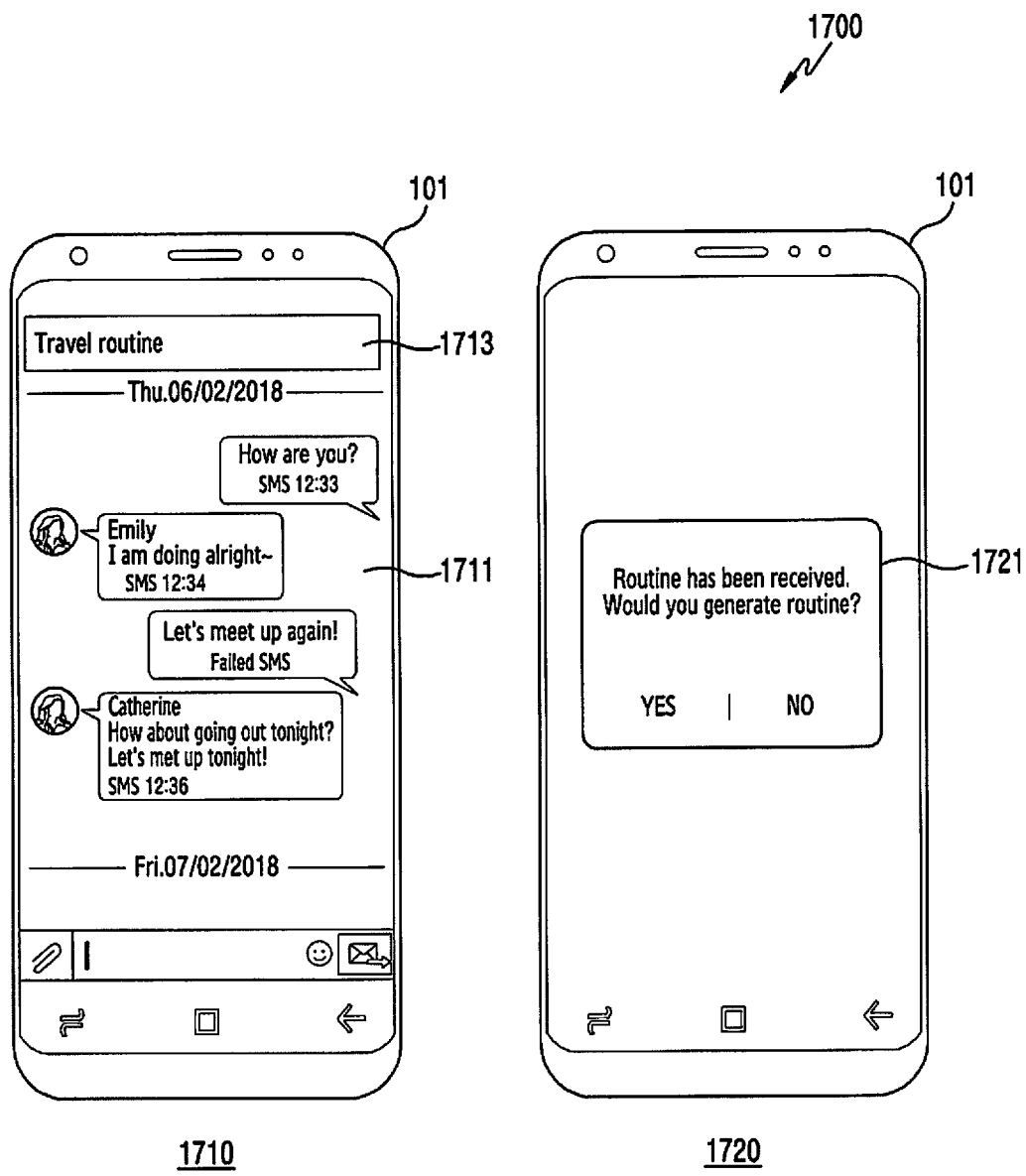
FIG. 17 is an illustration of a method for providing a routine, by an electronic device according to an embodiment, based on information regarding a routine received from another electronic device.

FIG. 17 is an illustration 1700 of a method for providing a routine, by the electronic device 101, according to an embodiment, based on information regarding a routine received from another electronic device.

Referring to FIG. 17, as illustrated in panel 1710, the processor 120 may enable transmission/reception of messages with another external electronic device by using a messenger application (for example, a chatting application). The processor 120 may display a screen 1711, including messages transmitted by the electronic device 101 and messages received from another electronic device, through the display device 160. The processor 120 may display information 1713 related to a travel routine received from another electronic device. The information 1713 related to a travel routine may include information necessary for the electronic device 101 to receive a travel routine (for example, a URL for downloading the travel routine).

If an input for receiving the travel routine is received from the user of the electronic device 101, the processor 120 may display information 1721 through the display device 160 so as to indicate whether or not to receive the travel routine, as illustrated in panel 1720.

The processor 120 may receive a travel routine through the communication module 190 if an input is received from the user of the electronic device 101 to allow (or accept) reception of the travel routine.

Figure 18:
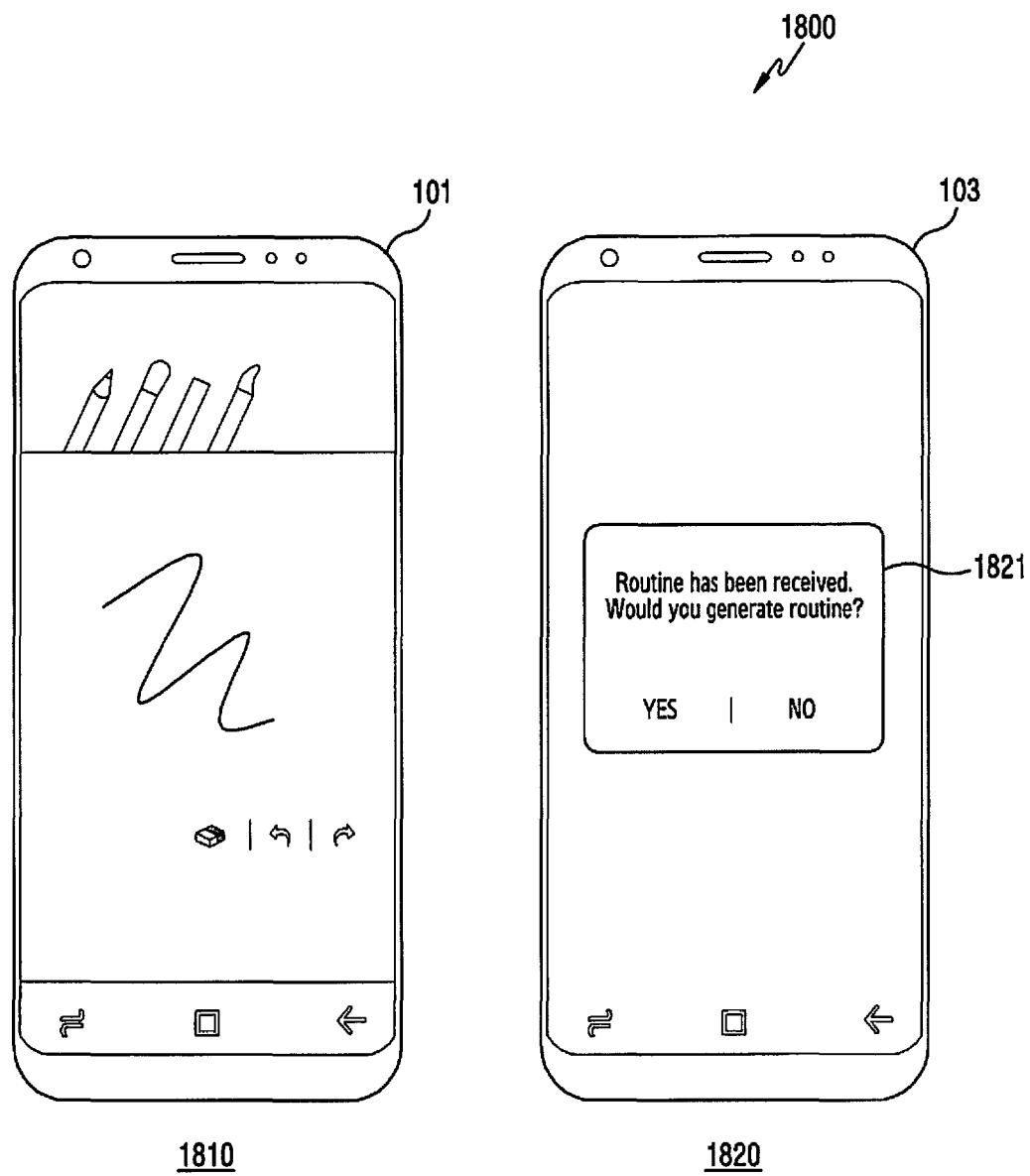
FIG. 18 is an illustration of a method for providing a routine, by an electronic device according to an embodiment, based on information regarding a routine received from another electronic device.

FIG. 18 is an illustration 1800 of a method for providing a routine, by the electronic device 101, according to an embodiment, based on information regarding a routine received from another electronic device. For example, FIG. 18 may be an illustration of a method for providing a routine related to a digital pen function.

Referring to FIG. 18, the electronic device 101 may store a routine related to a digital pen function. For example, as illustrated in panel 1810, the electronic device 101 may store a routine having a configured condition "if a digital pen related to the electronic device 101 is attached to the electronic device 101 and then detached therefrom, and if the note function is executed", and having an action "execute a function related to the digital pen configured by the user of the electronic device 101 (for example, thickness or color of a line to be displayed during a digital pen input)" configured to correspond to the condition.

The electronic device 101 may transmit information regarding a routine related to the digital pen function to the second electronic device 103 through the communication module 190. After receiving the routine related to the digital pen function from the electronic device 101, the second electronic device 103 may display information 1821 through the display device 160 to indicate whether or not to receive the routine related to the digital pen function, as illustrated in panel 1820.

The second electronic device 103 may receive the routine related to the digital pen function through the communication module if an input is received from the user of the second electronic device 103 to allow (or accept) the routine related to the digital pen function.

Figure 19:
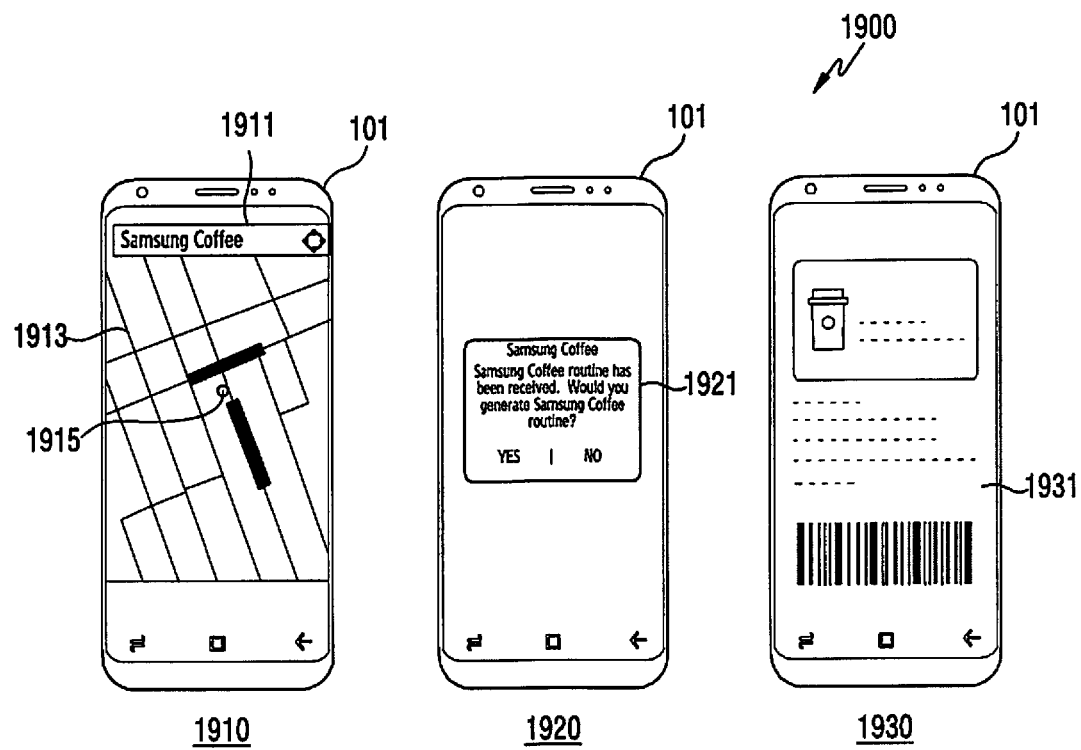
FIG. 19 is an illustration of a method for providing a routine related to a place of an electronic device according to an embodiment.

FIG. 19 is an illustration 1900 of a method for providing a routine related to a place of the electronic device 101 according to an embodiment.

Referring to FIG. 19, the electronic device 101 may receive a recommendation of a routine generated by another electronic device, while a routine is configured.

The processor 120 may receive an input to search for a certain place from the user on the screen for configuring the condition of a routine. As illustrated in panel 1910, if an input for searching for a certain place (for example, Samsung Coffee Shop) is received from the user, the processor 120 may display a map 1913 including an indicator 1915 that indicates the location of the certain place in an area 1911, through the display device 160.

If the certain place is found, the processor 120 may receive a routine (for example, a routine including a condition "the electronic device 101 is positioned at the certain place" and an action "display information related to a service provided at the certain place") related to a service provided at the certain place, from a device related to the certain place (for example, a server related to the service provided at the certain place). For example, as illustrated in panel 1920, if the certain place is found, the processor 120 may display information 1921 through the display device 160 to indicate whether or not to receive a routine related to a service provided at the certain place, from a device related to the certain place. If an input is received from the user of the electronic device 101 to allow the routine related to the service provided at the certain place, the processor 120 may receive the routine related to the service provided at the certain place.

If the routine related to the service provided at the certain place is received, and if the condition "the electronic device 101 is positioned at a certain place" is satisfied by the electronic device 101 positioned at (or entering) the certain place, the processor 120 may display information 1931 (for example, a menu or a coupon related to the service provided at the certain place) related to the service provided at the certain place through the display device 160, as illustrated in panel 1930.

If the electronic device 101 is positioned at a certain place, the electronic device 101 may receive a recommendation of a routine generated by another electronic device, from the other electronic device. For example, if the electronic device 101 is positioned at (or enters) a certain place, the processor 120 may receive a routine related to a service provided at the certain place from a device related to the certain place (for example, a server related to the service provided at the certain place).

Figure 20:
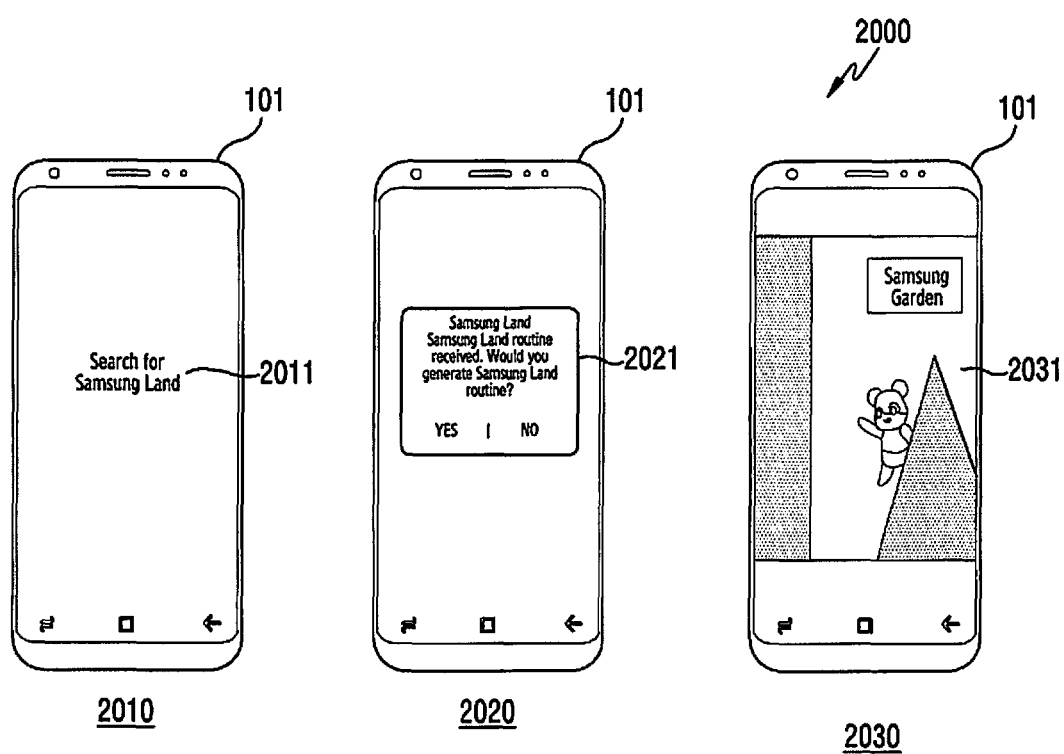
FIG. 20 is an illustration of a method for providing a routine related to a place of an electronic device according to an embodiment.

FIG. 20 is an illustration 2000 of a method for providing a routine related to a place of an electronic device according to an embodiment.

Referring to FIG. 20, the electronic device 101 may receive a recommendation of a routine generated by another electronic device, from the other electronic device, at least partially based on information regarding a point of interest of a user of the electronic device 101.

The processor 120 may determine the point of interest of the user of the electronic device 101 based on log information of the electronic device 101. For example, if the user of the electronic device 101 has searched for a certain place at least a designated number of times, as illustrated on the screen 2011 of panel 2010, for a designated period of time, the processor 120 may determine the certain place as the point of interest.

If a certain place is determined as the point of interest, the processor 120 may transmit information indicating that the certain place is determined (or registered) as the point of interest, through the communication module 190, to the electronic device 101 related to the certain place (or server managing a service related to the certain place).

If the electronic device 101 is positioned at the certain place determined as the point of interest (or at a location adjacent to the certain place), the processor 120 may receive a recommendation of a routine related to the certain place from another electronic device related to the certain place (or routine related to the service provided at the certain place). For example, if the electronic device 101 is positioned at the certain place determined as the point of interest, the processor 120 may display information 2021 through the display device 160 to indicate whether or not to receive a routine related to the certain place, as illustrated in panel 2020. If an input is received from the user of the electronic device 101 to allow the routine related to the service provided at the certain place, the processor 120 may receive the routine related to the certain place.

The processor 120 may execute the received routine related to the certain place. For example, as illustrated in panel 2030, the processor 120 may display information 2031 related to the service provided at the certain place (for example, information regarding a menu, a coupon, a promotion, or amenities) through the display device 160.

Figure 21:
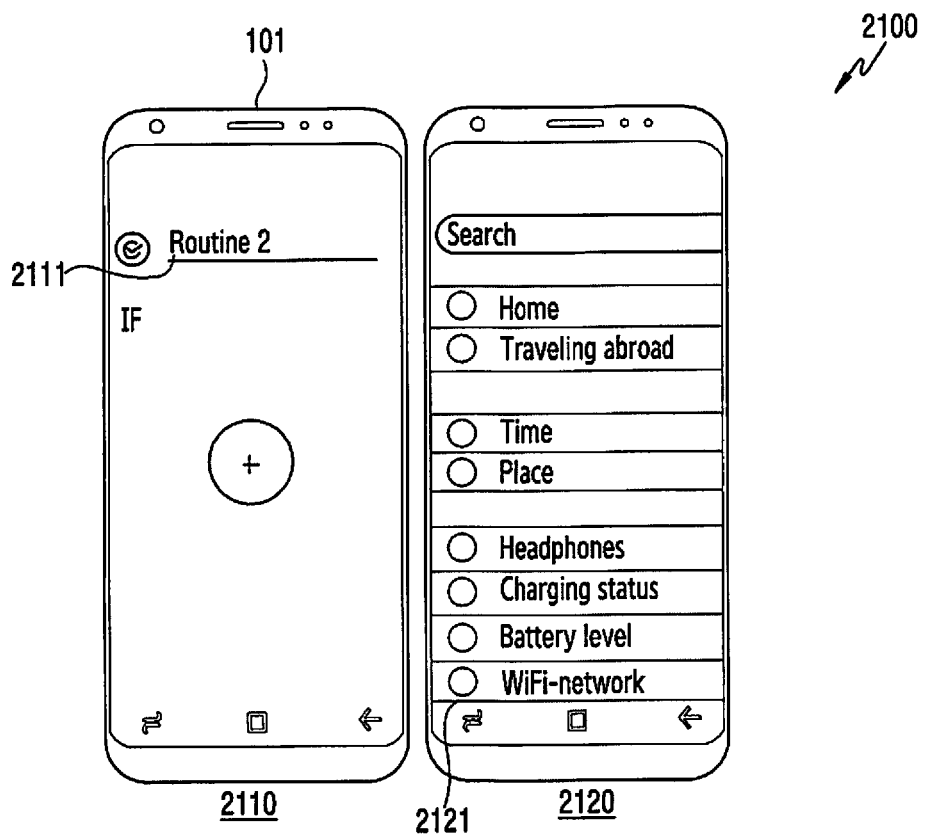
FIG. 21 is an illustration of a method for configuring a routine of an electronic device according to an embodiment.
Figure 21:
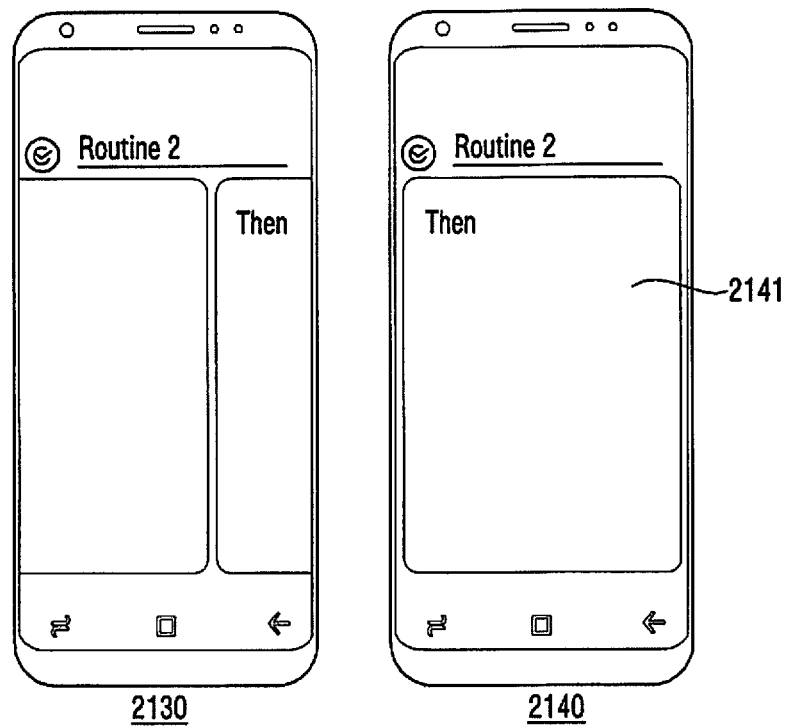

FIG. 21 is an illustration 2100 of a method for configuring a routine of the electronic device 101 according to an embodiment.

Referring to FIG. 21, when a function for configuring a routine is executed, the processor 120 may display a screen for inputting a routine name 2111 (for example, Routine 2) through the display device 160, as illustrated in panel 2110.

After the routine name 2111 is inputted, the processor 120 may display a screen for configuring conditions (for example, home, traveling abroad, time, place, headphones, charging status, battery level, and Wi-Fi network) through the display device 160, as illustrated in panel 2120.

In response to a user input with regard to the screen for configuring conditions (for example, a swipe or a drag input), the processor 120 may display a screen for configuring an action 2141 (for example, Wi-Fi device activation 2121 in panel 2120) through the display device 160, as illustrated in panel 2130 and panel 2140.

The processor 120 may receive an input related to the routine name 2111, conditions, and action 2141, thereby generating (or configuring) a routine.

However, the routine-configuring method is not limited to the method described above with reference to FIG. 21.

Figure 22:
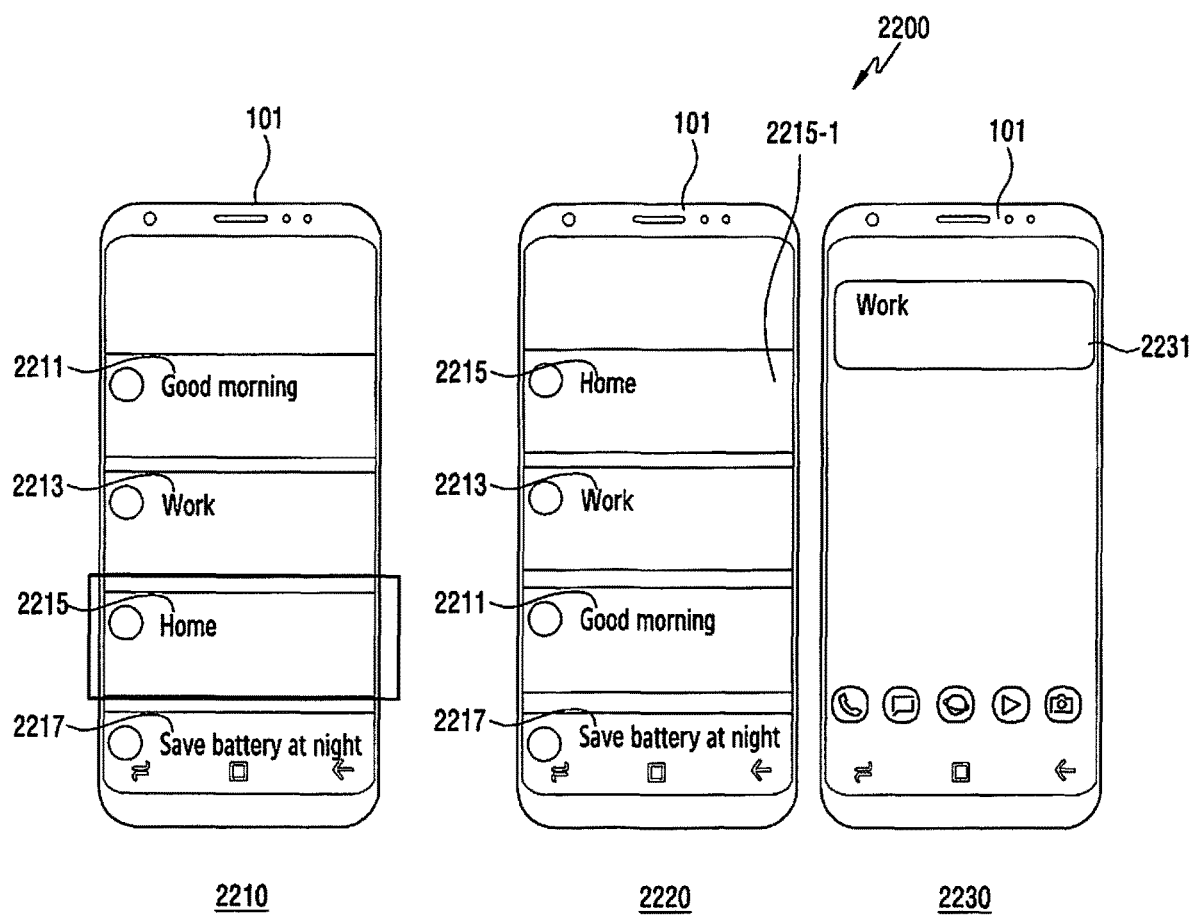
FIG. 22 is an illustration of a method for configuring a routine of an electronic device according to an embodiment.

FIG. 22 is an illustration 2200 of a method for configuring a routine of the electronic device 101 according to an embodiment.

Referring to FIG. 22, the processor 120 may display information regarding a preset routine, which may be configured as a routine, through the display device 160. The preset routine may be a preliminary routine which is generated by a designer of the electronic device 101 or by a developer of an application, and which serves as a basis for generating a routine. The processor 120 may display preset conditions (for example, good morning 2211, work 2213, home 2215, and save battery at night 2217) (or a list of preset conditions) through the display device 160, as illustrated in panel 2210.

The processor 120 may recommend at least one preset routine, among preset routines, at least partially based on log information of the electronic device 101 or a usage pattern of a user of the electronic device 101. For example, the processor 120 may determine location information regarding a home of the user of the electronic device 101, at least partially based on location information (for example, coordinate information) of the electronic device 101 collected for a designated period of time (for example, one month) and time information of the electronic device 101. The processor 120 may map the determined location information regarding the home of the user of the electronic device 101 to a preset condition (for example, home 2215) related to the home. If the processor 120 maps the location information regarding the home of the user of the electronic device 101 to a preset condition related to the home, the processor 120 may indicate through the display device 160 that the preset condition related to the home may be configured as a condition of a routine. For example, as illustrated panel 2220, the processor 120 may display, through the display device 160, the preset condition (for example, home 2215) related to the home above other preset conditions and may display information 2215-1 indicating that the preset condition related to the home may be configured as a condition of the routine.

If the preset routine is configured as a routine, the processor 120 may display a notification 2231 through the display device 160 to indicate configuration of the routine, as illustrated in panel 2230.

Figure 23:
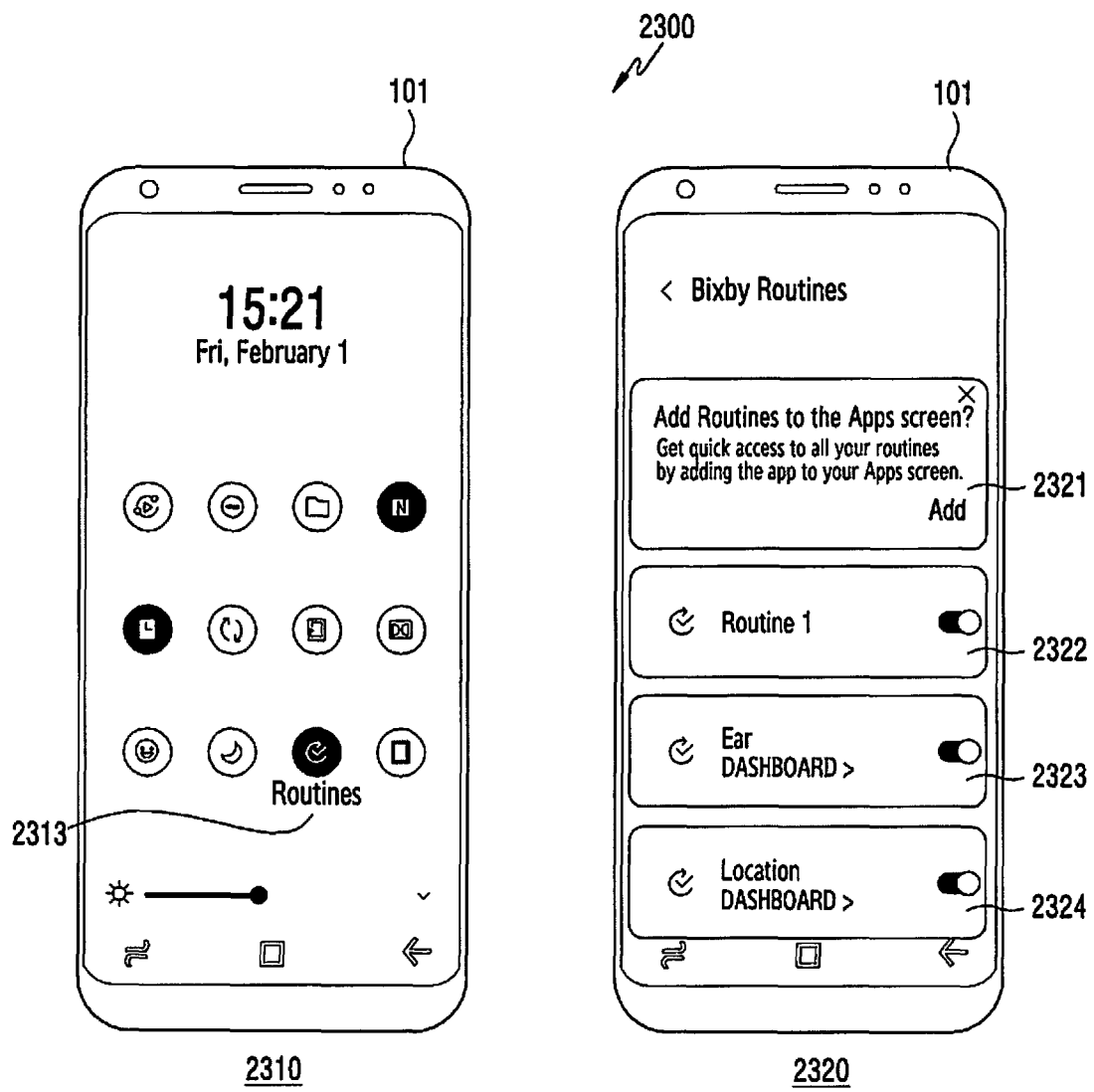
FIG. 23 is an illustration of a method for configuring a routine of an electronic device according to an embodiment.

FIG. 23 is an illustration 2300 of a method for configuring a routine of the electronic device 101 according to an embodiment.

Referring to FIG. 23, the processor 120 may display a generated routine through the display device 160 in various types.

As illustrated in panel 2310, the processor 120 may display a generated routine. For example, the processor 120 may display a quick panel 2311 including a generated routine 2313, at least partially based on a drag input from a part of a housing of the electronic device 101 to the display device 160.

However, the method for displaying the generated routine is not limited to panel 2310. For example, the processor 120 may display the generated routine in a designated area of the currently displayed screen (for example, an upper end of the screen). For example, the processor 120 may display the generated routine through another screen distinguished from the currently displayed screen.

If a user input regarding the generated routine 2313 is received, the processor 120 may display at least one generated routine through the display device 160. For example, the processor 120 may display a screen including information 2321 for generating an additional routine and information 2322, 2323, and 2324 regarding generated routines, through the display device 160, as illustrated in panel 2320.

Figure 24:
FIG. 24 is an illustration of a method for displaying an icon in a lock state of an electronic device according to an embodiment.

FIG. 24 is an illustration 2400 of a method for displaying an icon in a lock state of the electronic device 101 according to an embodiment.

Referring to FIG. 24, the processor 120 may display an icon related to an application program through the display device 160, in a lock (or locked) state of the electronic device 101, and when the electronic device 101 is in a designated state.

If the electronic device 101 is in a designated state (for example, if the electronic device 101 is positioned at a home of a user of the electronic device 101), the processor 120 may display an icon related to an application program, at least partially based on the frequency of use of applications in the designated state, through the display device 160, in the lock state of the electronic device 101. For example, if the electronic device 101 is in the designated state, the processor 120 may display an icon 2420 and an icon 2430 corresponding to application programs most frequently used for a designated period of time, in the bottom area of the display device 160, in the lock state of the electronic device 101. However, the method for displaying the icons 2420 and the icon 2430 is not limited to the method of displaying the same in the bottom area of the display device 160.

If the state of the electronic device 101 is changed (for example, if the state of the electronic device 101 is changed from a designated first state to a designated second state), the processor 120 may display an icon related to an application program, at least partially based on the frequency of use of applications in the changed designated state.

Figure 25:
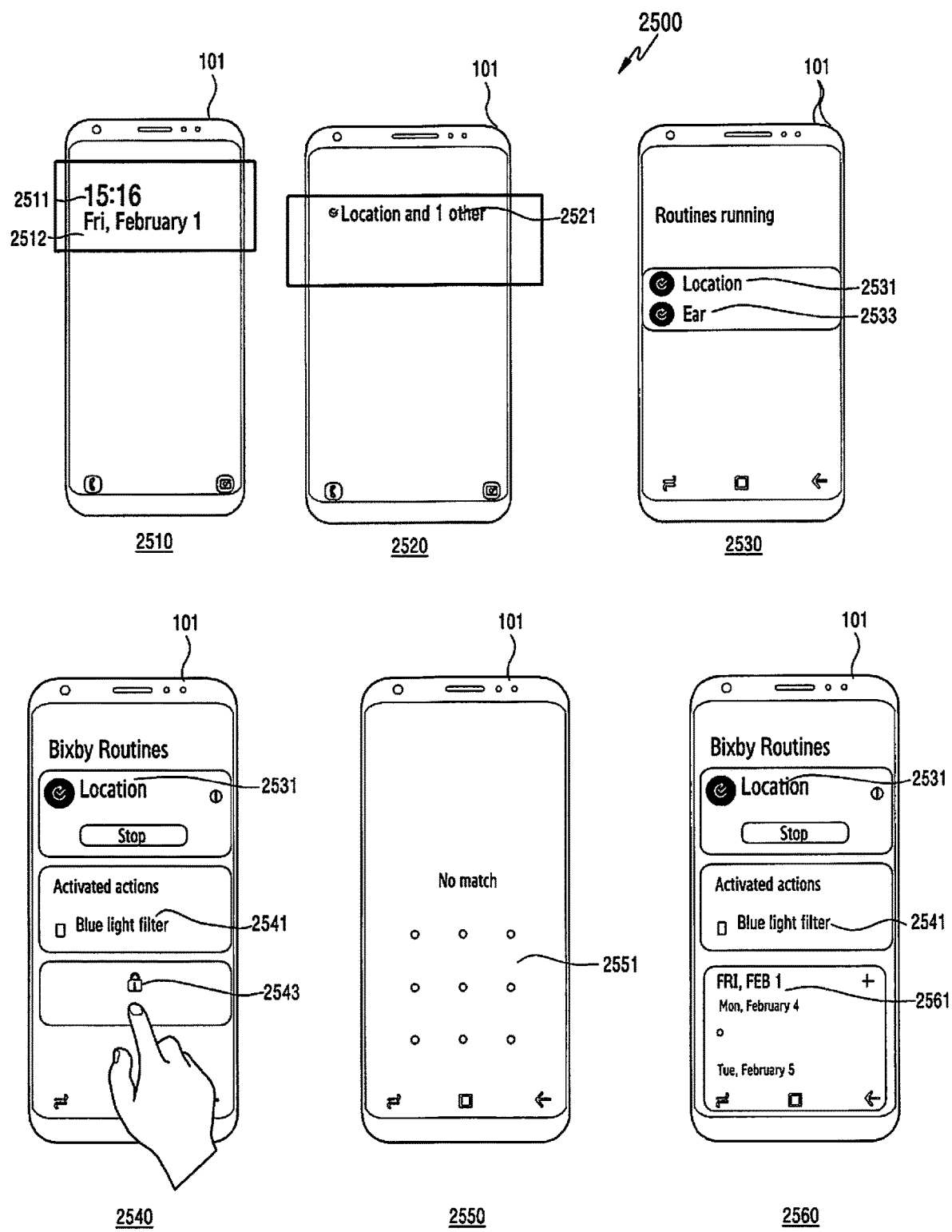
FIG. 25 is an illustration of a method for displaying information related to a routine in a lock state of an electronic device according to an embodiment.

FIG. 25 is an illustration 2500 of a method for displaying information related to a routine in a lock state of the electronic device 101 according to an embodiment.

Referring to FIG. 25, the processor 120 may display information related to a generated routine through the display device 160 in a lock (or locked) state of the electronic device 101.

The processor 120 may display information regarding a currently executed routine or information indicating that there is a currently executed routine, together with information 2511 indicating the time, through the display device 160 in the lock state of the electronic device 101. The processor 120 may display information 2512 regarding the representative routine among multiple routines currently executed (for example, information regarding the routine executed most recently (or last)) through the display device 160, as illustrated in panel 2510, in the lock state of the electronic device 101.

At least partially based on a user input regarding the information 2512 regarding the representative routine, the processor 120 may display information 2521 indicating at least one currently executed routine through the display device 160, as illustrated in panel 2520.

At least partially based on a user input regarding the information 2521 indicating at least one currently executed routine, the processor 120 may display a list of at least one routine 2531 and 2533 through the display device 160, as illustrated in panel 2530.

At least partially based on a user input regarding a routine 2531 among the at least one currently executed routine 2531 and 2533, the processor 120 may display one or more actions 2541 among at least one action corresponding to the routine 2531, through the display device 160, as illustrated in panel 2540. The processor 120 may not display information regarding an action related to personal information of the user of the electronic device 101, among the at least one action corresponding to the routine 2531. As illustrated in panel 2540, the processor 120 may display information 2543 indicating that user authentication is necessary to display the action related to personal information of the user of the electronic device 101, among the at least one action corresponding to the routine 2531, through the display device 160.

As illustrated in panel 2550, a screen 2551 for authenticating the user may be displayed through the display device 160, based on a user input regarding the information 2543 indicating that user authentication is necessary to display the action related to personal information of the user of the electronic device 101.

If user authentication is successful, the processor 120 may display information 2561 (for example, predetermined information configured by the user) regarding the action related to the personal information of the user of the electronic device 101, through the display device 160, as illustrated in panel 2560.

Figure 26:
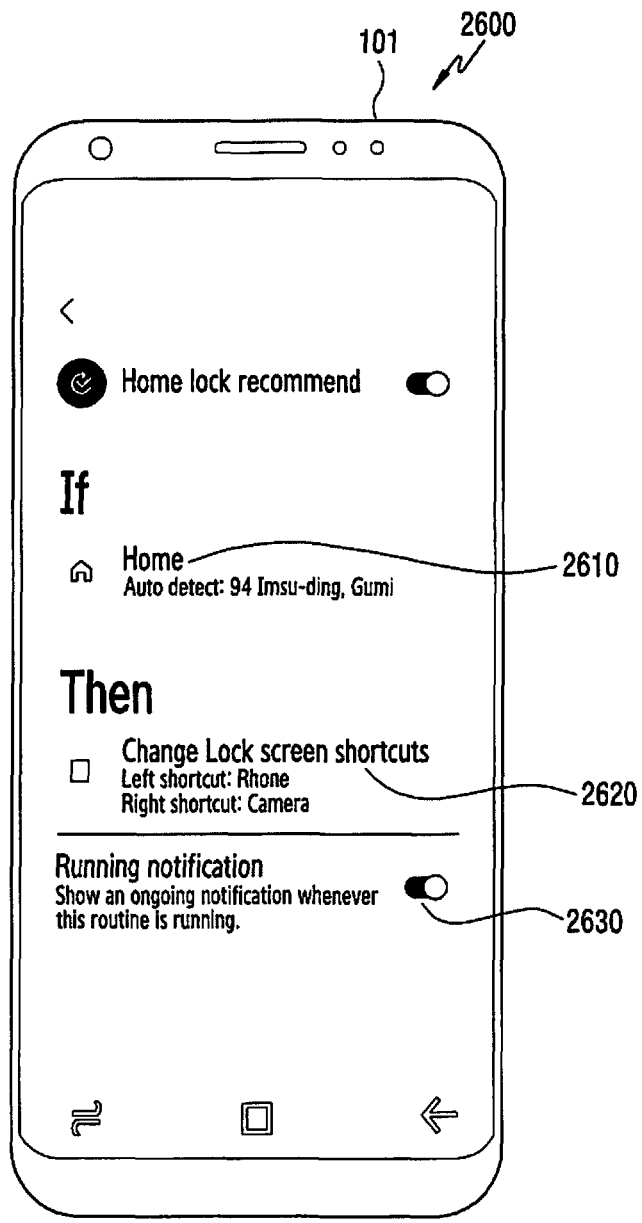
FIG. 26 is an illustration of a method for generating a routine related to a lock state of an electronic device according to an embodiment.

FIG. 26 is an illustration 2600 of a method for generating a routine related to a lock state of the electronic device 101 according to an embodiment.

Referring to FIG. 26, the processor 120 may configure a routine that may be executed in a lock state of the electronic device 101.

The processor 120 may configure a condition 2610 "if positioned home" and an action 2620 "display a phone icon and a camera icon in the lock state of the electronic device 101." The processor 120 may display an object 2630 for selecting whether or not to display a notification related to a routine related to the lock state of the electronic device 101, through the display device 160.

However, the method for generating a routine related to the lock state of the electronic device 101 is not limited to the method described above with reference to FIG. 26.

Figure 27:
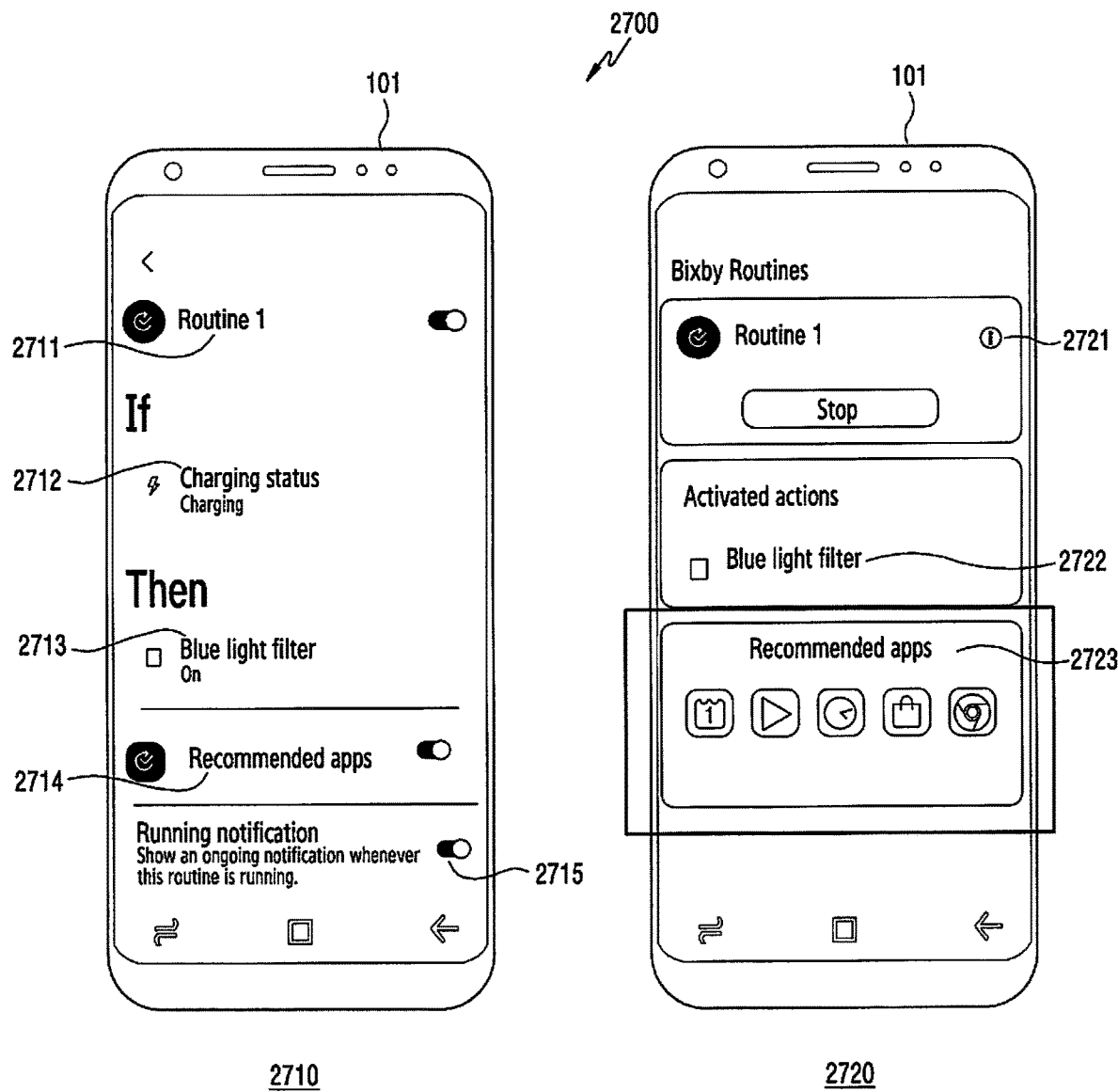
FIG. 27 is an illustration of a method for recommending a routine of an electronic device according to an embodiment.

FIG. 27 is an illustration 2700 of a method for recommending a routine of the electronic device 101 according to an embodiment.

Referring to FIG. 27, the processor 120 may generate (or configure) a routine. For example, the processor 120 may generate a routine including a routine name 2711 (for example, Routine 1), a condition 2712 (for example, "if a charging state arrives"), and an action 2713 (for example, "execute the blue light filter function"), as illustrated in panel 2710.

The processor 120 may recommend a routine (for example, an action) at least partially based on a usage pattern of a user of the electronic device 101. For example, the processor 120 may display information 2714 for recommending an application related to a function frequently performed by the electronic device 101, if the condition 2712 (for example, "if a charging state arrives") is satisfied, through the display device 160.

The processor 120 may display an object 2715 for selecting whether or not to display a notification related to the routine, through the display device 160.

After a routine is generated, the processor 120 may display information indicating that the routine is being executed, through the display device 160. At least partially based on a user input regarding the information indicating that the routine is being executed, the processor 120 may display information that recommends an application related to a function most frequently performed by the electronic device 101 when the routine (for example, a condition of the routine) is satisfied, through the display device 160. For example, as illustrated in panel 2720, the processor 120 may display information 2723 that recommends the application related to the function most frequently performed by the electronic device 101 when the routine is satisfied, through the display device 160, together with the routine name 2721 and the action 2722.

However, the routine-recommending method is not limited to the example described above with reference to FIG. 27.

In addition, the structure of data used in the embodiments described above may be recorded in a non-transitory computer-readable recording medium through various means. The non-transitory computer-readable recording medium includes storage media such as magnetic storage media (for example, ROMs, floppy disks, hard disks, etc.) and optically readable media (for example, CD-ROMs, digital versatile discs (DVDs), etc.).

The present disclosure is disclosed above in connection with the embodiments thereof. It will be understood by those skilled in the art to which the present disclosure belongs that the present disclosure may be implemented in modified forms without departing from the scope of the present disclosure. Therefore, the present disclosure should be considered from an illustrative point of view, rather than a limitative point of view. The scope of the present disclosure is defined by the appended claims and their equivalents.

What is claimed is:

1. An electronic device, comprising:
a display configured to display a user interface;
at least one processor operably coupled to the display; and
a memory operably coupled to the at least one processor, wherein the memory is configured to store instructions that, when executed, cause the at least one processor to:
generate a first routine including a first condition and a first action;
determine, when the electronic device is in a first state, whether or not the first condition is satisfied based on context information indicating at least one of a user occasion, a location coordinate relative to a user of the electronic device, and a time;
perform the first action of changing a state of the electronic device from the first state to a second state if the first condition is satisfied;

display information indicating that the first routine is being executed, if the first condition is satisfied, through the user interface, in a lock state of the electronic device;

identify whether a user input of changing the state of the electronic device from the second state to a third state received through the display is detected;

compare the second state with a current state of the electronic device in response to the first condition being released;

in response to the second state and the current state being identical:
    identify that the user input is not detected, and
    restore the state of the electronic device to the first state that is a state before the first action is performed based on identifying that the user input is not detected;

in response to the second state and the current state not being identical:
    identify that the user input is detected, and
    maintain the third state changed from the second state based on identifying that the user input is detected;

acquire information regarding a pattern of a user of the electronic device for a designated period of time;

generate a second routine at least partially based on the information regarding the pattern of the user;

recommend the second routine if a second condition included in the second routine is different from the first condition; and output a notification through the user interface such that, if the second condition is identical to the first condition, and if a second action included in the second routine is different from the first action, the first routine further comprises the second action.

2. The electronic device of claim 1, further comprising at least one of a communication interface or a sensor module, wherein the memory is further configured to store instructions that, when executed, cause the at least one processor to determine whether or not the first condition is satisfied, at least partially based on data acquired by at least one of the communication interface or the sensor module.

3. The electronic device of claim 2, wherein the memory is further configured to store instructions that, when executed, cause the at least one processor to set a priority for the user occasion, the location coordinate relative to the user of the electronic device, the time and the application included in the context information.

4. The electronic device of claim 3, wherein the memory is further configured to store instructions that, when executed, cause the at least one processor to generate the first routine based on the context information, and determine whether or not the first condition is satisfied based on the context information including at least the location coordinate relative to the user of the electronic device.

5. The electronic device of claim 1, wherein the memory is further configured to store instructions that, when executed, cause the at least one processor to display detailed information regarding the first routine, at least partially based on a user input regarding the information indicating that the first routine is being executed.

6. The electronic device of claim 1, wherein the memory is further configured to store instructions that, when executed, cause the at least one processor to generate the first routine that is executable, in the lock state of the electronic device.

7. The electronic device of claim 1, wherein the memory is further configured to store instructions that, when executed, cause the at least one processor to:
    acquire a log related to a state changed in the electronic device if the first condition is satisfied, for a designated period of time;
    determine a second action related to the state changed in the electronic device, at least partially based on the log; and
    recommend the second action.

8. The electronic device of claim 1, wherein the memory is further configured to store instructions that, when executed, cause the at least one processor to display information related to the first routine through the user interface.

9. The electronic device of claim 1, wherein the memory is further configured to store instructions that, when executed, cause the at least one processor to:
    determine whether or not a second condition is satisfied when the electronic device is in the second state;
    perform a second action of changing the state of the electronic device from the second state to a fourth state if the second condition is satisfied;
    maintain the state of the electronic device in the fourth state if the first condition is released prior to the second condition, when the electronic device is in the fourth state;
    restore the state of the electronic device from the fourth state to the first state if the second condition is released after the first condition is released;
    change the state of the electronic device from the fourth state to the second state if the second condition is released prior to the first condition, when the electronic device is in the fourth state; and
    restore the state of the electronic device from the second state to the first state if the first condition is released after the second condition is released.

10. The electronic device of claim 9, further comprising at least one of a communication interface or a sensor module, wherein the memory is further configured to store instructions that, when executed, cause the at least one processor to determine whether or not the first condition and the second condition are satisfied, at least partially based on data acquired by at least one of the communication interface or the sensor module.

* * * * *